United States Patent
Li et al.

(10) Patent No.: US 11,625,490 B2
(45) Date of Patent: Apr. 11, 2023

(54) METHOD AND APPARATUS FOR OBTAINING INPUT OF SECURE MULTIPARTY COMPUTATION PROTOCOL

(71) Applicant: ADVANCED NEW TECHNOLOGIES CO., LTD., Grand Cayman (KY)

(72) Inventors: Lichun Li, Hangzhou (CN); Shan Yin, Hangzhou (CN); Zheng Liu, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 271 days.

(21) Appl. No.: 16/455,685

(22) Filed: Jun. 27, 2019

(65) Prior Publication Data

US 2020/0004973 A1 Jan. 2, 2020

(30) Foreign Application Priority Data

Jun. 29, 2018 (CN) .......................... 201810715295.9

(51) Int. Cl.
*G06F 21/60* (2013.01)
*H04L 9/00* (2022.01)
(Continued)

(52) U.S. Cl.
CPC ............ *G06F 21/602* (2013.01); *H04L 9/008* (2013.01); *H04L 9/0643* (2013.01);
(Continued)

(58) Field of Classification Search
CPC ..... G06F 21/602; H04L 9/008; H04L 9/0643; H04L 9/3247; H04L 2209/38; H04L 2209/46

See application file for complete search history.

(56) References Cited

U.S. PATENT DOCUMENTS 6,851,053 B1 2/2005 Liles et al.
8,515,058 B1 * 8/2013 Gentry .................... H04L 9/008
380/28

(Continued)

FOREIGN PATENT DOCUMENTS

CN 106372868 A 2/2017
CN 107196918 A 9/2017
(Continued)

OTHER PUBLICATIONS

International Search Report and Written Opinion for International Application No. PCT/US2019/039629 dated Oct. 2, 2019. (16 pages).

(Continued)

*Primary Examiner* — Trang T Doan
*Assistant Examiner* — Vladimir I Gavrilenko

(57) ABSTRACT

Privacy protection methods, systems, and apparatus, including computer programs encoded on computer storage media, are provided. One of the methods is performed by a second computing device and includes: receiving a data request for object data from a first computing device, wherein the object data is associated with an object and is stored in the second computing device; performing encryption of the object data using a public key associated with the object based on the data request to generate a first ciphertext; obtaining verification data based on the first ciphertext for verifying whether a ciphertext to be verified corresponds to the object data; and sending the verification data to the first computing device for the first computing device to execute a cryptography protocol with a third computing device based on the verification data.

11 Claims, 8 Drawing Sheets

(51) Int. Cl.
*H04L 9/06* (2006.01)
*H04L 9/32* (2006.01)

(52) U.S. Cl.
CPC .............. *H04L 9/3247* (2013.01); *H04L 9/50* (2022.05); *H04L 2209/46* (2013.01)

(56) References Cited

U.S. PATENT DOCUMENTS

| | | | |
|---|---|---|---|
| 8,527,765 | B2 | 9/2013 | Veugen et al. |
| 9,774,578 | B1 | 9/2017 | Ateniese et al. |
| 9,887,975 | B1 | 2/2018 | Gifford et al. |
| 10,020,935 | B1 | 7/2018 | Ghetti et al. |
| 10,289,816 | B1* | 5/2019 | Malassenet ............. G06F 21/14 |
| 11,070,378 | B1* | 7/2021 | Griffin .................. H04L 9/3247 |
| 2005/0204128 | A1 | 9/2005 | Aday et al. |
| 2012/0169460 | A1 | 7/2012 | Thumparthy |
| 2013/0083926 | A1 | 4/2013 | Hughes et al. |
| 2013/0262857 | A1 | 10/2013 | Neuman et al. |
| 2015/0100785 | A1 | 4/2015 | Joye et al. |
| 2016/0044003 | A1 | 2/2016 | Raykova et al. |
| 2016/0105414 | A1 | 4/2016 | Bringer et al. |
| 2016/0119346 | A1 | 4/2016 | Chen et al. |
| 2016/0156611 | A1 | 6/2016 | Rozman et al. |
| 2016/0261409 | A1 | 9/2016 | French et al. |
| 2016/0344557 | A1 | 11/2016 | Chabanne et al. |
| 2017/0142090 | A1 | 5/2017 | Mahaffey et al. |
| 2017/0149796 | A1 | 5/2017 | Gvili |
| 2018/0139054 | A1 | 5/2018 | Chu et al. |
| 2018/0349577 | A1 | 12/2018 | Goldwasser et al. |
| 2018/0367298 | A1 | 12/2018 | Wright et al. |
| 2019/0013948 | A1* | 1/2019 | Mercuri .................. G06F 16/27 |
| 2019/0036678 | A1* | 1/2019 | Ahmed ................... H04L 9/302 |
| 2019/0116180 | A1* | 4/2019 | Teranishi .............. H04L 9/3234 |
| 2019/0123889 | A1 | 4/2019 | Schmidt-karaca |
| 2019/0361917 | A1* | 11/2019 | Tran ..................... G06Q 20/308 |
| 2019/0362054 | A1 | 11/2019 | Diehl |
| 2021/0089676 | A1* | 3/2021 | Ford ..................... H04L 9/0825 |

FOREIGN PATENT DOCUMENTS

| | | |
|---|---|---|
| CN | 107528688 A | 12/2017 |
| CN | 108023894 A | 5/2018 |
| WO | 2013048674 A1 | 4/2013 |
| WO | 2013151854 A1 | 10/2013 |
| WO | 2017145010 A1 | 8/2017 |

OTHER PUBLICATIONS

Ziegeldorf et al., "CoinParty: Secure Multi-Party Mixing of Bitcoins", Proceedings of the 5th ACM Conference on Data and Application Security and Privacy, CODASPY '15, pp. 75-86, Jan. 1, 2015 (12 pages).
Notice of Allowance for U.S. Appl. No. 16/784,421 dated Jul. 2, 2020.
Search Report for Taiwanese Application No. 108110468 dated Mar. 25, 2020.
First Search for Chinese Application No. 201810715295.9 dated May 8, 2020.
Preinterview first office action for U.S. Appl. No. 16/784,421 dated Apr. 8, 2020.
Written Opinion on the International Preliminary Examining Authority for PCT Application No. PCT/US2019/039629 dated Feb. 19, 2020.

* cited by examiner

METHOD AND APPARATUS FOR OBTAINING INPUT OF SECURE MULTIPARTY COMPUTATION PROTOCOL

CROSS REFERENCE TO RELATED APPLICATION

The present application claims priority to Chinese Patent Application No. 201810715295.9 filed on Jun. 29, 2018, the entire content of which is incorporated herein by reference in the entirety.

TECHNICAL FIELD

Embodiments of the present specification relate to the field of cryptography technologies, and particularly to methods and apparatuses for obtaining an input of a secure multiparty computation protocol.

BACKGROUND

When applying for loans, applying for visas, filing taxes, etc., an entity (individual, enterprise, or organization) usually needs to provide its own privacy data (age, savings, gender, income) to another entity (or entities or even the public) for the latter to perform calculation/evaluation. The former entity is referred to as a demonstrator, and the latter entity is referred to as a validator. The demonstrator may lie when providing the data, so one or more entities (endorsers) are required to provide certificates, such as a certificate of deposit provided by a bank endorser and an identity card/business license provided by a government endorser.

When the demonstrator submits his or her private data to the validator for calculation/evaluation, the demonstrator may worry about privacy leakage. Further, if another method is adopted such that the calculation/evaluation method is given to the demonstrator and the demonstrator only provides the calculation result to the validator, there is a possibility that the demonstrator commits fraud, that is, the demonstrator may use falsified data for calculation and may not make a calculation in faithful accordance with the calculation method provided.

In order to solve the forgoing dilemma between data privacy and data credibility, zero-knowledge proof, hashing, digital signature, and blockchain technologies are used in combination in existing technologies. When the endorser stores the demonstrator's data, the hash value of the data and the endorser's digital signature for the hash value are recorded in the blockchain ledger. To prevent a brute force attack caused by a too small data value space, random numbers are used in hashing. The storage proof sent by the endorser to the demonstrator contains a hash value, a random number used for hashing, a recording position in the blockchain ledger, and optionally contains a digital signature for the hash value. The storage proof sent by the demonstrator to the validator contains a hash value, a recording position in the blockchain ledger, and optionally contains a digital signature for the hash value. Then, through the zero-knowledge proof technique, the validator can verify that the data used by the demonstrator in the calculation of the Function f matches the hash value in the storage proof, and that the demonstrator does not use other functions to replace f in the calculation and faithfully executes the Function f. Thus, the validator can finally get a credible calculation result. This process requires the complicated zero-knowledge proof technology and significant computational and storage resources.

Therefore, a more effective solution for obtaining an input of a secure multiparty computation protocol is required.

SUMMARY

The embodiments of the present specification are intended to provide more effective methods and apparatuses for obtaining an input of a secure multiparty computation protocol, in order to remedy the deficiencies in existing technologies.

In some embodiments, a method for obtaining an input of a secure multiparty computation protocol is provided, wherein participants of the secure multiparty computation protocol include a first server which is the server of an object, and the secure multiparty computation protocol bases the calculation on object data of the object, wherein the object data is stored in a second server which is the server of an authorized organization, and the method is executed by the second server and comprises: receiving a data request for the object data from the first server; performing homomorphic encryption of the object data using a public key received from the first server in advance based on the data request to generate a first ciphertext, wherein the public key is the public key of the object for homomorphic encryption; obtaining verification data based on the first ciphertext, wherein the verification data is used for verifying whether the ciphertext to be verified corresponds to the object data; and sending the verification data to the first server.

In some embodiments, a method for obtaining an input of a secure multiparty computation protocol is provided, wherein participants of the secure multiparty computation protocol include a first server which is the server of an object and a third server, and the secure multiparty computation protocol bases the calculation on object data of the object, wherein the object data is stored in a second server which is the server of an authorized organization, and the method is executed by the first server and comprises: sending a data request for the object data to the second server; obtaining a second ciphertext corresponding to the object data, wherein the second ciphertext is the homomorphically encrypted ciphertext obtained through a public key of the object generated in advance; receiving from the second server the verification data obtained through any one of the methods for obtaining an input of a secure multiparty computation protocol; and sending the second ciphertext and the verification data to the third server.

In some embodiments, a method for obtaining an input of a secure multiparty computation protocol is provided, wherein participants of the secure multiparty computation protocol include a first server which is the server of an object and a third server, and the secure multiparty computation protocol bases the calculation on object data of the object, wherein the object data is stored in a second server which is the server of an authorized organization, and the method is executed by the first server and comprises: sending a data request for the object data to the second server; receiving from the second server the storage location of the first ciphertext and the authorized organization's digital signature for the first ciphertext in the blockchain ledger; and sending the location in the blockchain ledger to the third server.

In some embodiments, a method for obtaining an input of a secure multiparty computation protocol is provided, wherein participants of the secure multiparty computation protocol include a first server which is the server of an object and a third server, and the secure multiparty computation protocol bases the calculation on object data of the object, wherein the object data is stored in the first server, and the method is executed by the first server and comprises: performing homomorphic encryption of the object data using a public key of the object generated in advance to obtain the ciphertext corresponding to the object data; storing the ciphertext in a blockchain to obtain the storage location of the ciphertext in the blockchain ledger; and sending the ciphertext and the location in the blockchain ledger to the third server.

In some embodiments, a method for obtaining an input of a secure multiparty computation protocol is provided, wherein participants of the secure multiparty computation protocol include a first server which is the server of an object and a third server, and the secure multiparty computation protocol bases the calculation on object data of the object, wherein the object data is stored in the first server, and the method is executed by the first server and comprises: performing homomorphic encryption of the object data using a public key of the object generated in advance to obtain the ciphertext corresponding to the object data; storing the ciphertext and a digital signature of the object to the ciphertext in a blockchain to obtain the storage locations of the ciphertext and the digital signature in the blockchain ledger, wherein the digital signature is generated by the first server; and sending the location in the blockchain ledger to the third server.

In some embodiments, a method for obtaining an input of a secure multiparty computation protocol is provided, wherein participants of the secure multiparty computation protocol include a first server which is the server of an object and a third server, and the secure multiparty computation protocol bases the calculation on object data of the object, wherein the object data is stored in a second server which is the server of an authorized organization, and the method is executed by the third server and comprises: receiving from the first server the second ciphertext and the verification data obtained through the method executed on the first server; verifying the second ciphertext using the verification data to determine whether the second ciphertext corresponds to the object data; and determining the second ciphertext as an input to the secure multiparty computation protocol when it is determined that the second ciphertext corresponds to the object data.

In some embodiments, a method for obtaining an input of a secure multiparty computation protocol is provided, wherein participants of the secure multiparty computation protocol include a first server which is the server of an object and a third server, and the secure multiparty computation protocol bases the calculation on object data of the object, wherein the object data is stored in a second server which is the server of an authorized organization, and the method is executed by the third server and comprises: receiving from the first server the storage location of the first ciphertext and the authorized organization's digital signature for the first ciphertext in the blockchain ledger; and obtaining the first ciphertext from the location in the blockchain ledger to be used as an input to the secure multiparty computation protocol.

In some embodiments, a method for obtaining an input of a secure multiparty computation protocol is provided, wherein participants of the secure multiparty computation protocol include a first server which is the server of an object and a third server, and the secure multiparty computation protocol bases the calculation on object data of the object, wherein the object data is stored in the first server, and the method is executed by the third server and comprises: receiving from the first server the ciphertext and the location in the blockchain ledger obtained through the method executed on the first server; verifying the ciphertext using the location in the blockchain ledger to determine whether the ciphertext corresponds to the object data; and determining the ciphertext as an input to the secure multiparty computation protocol when it is determined that the ciphertext corresponds to the object data.

In some embodiments, a method for obtaining an input of a secure multiparty computation protocol is provided, wherein participants of the secure multiparty computation protocol include a first server which is the server of an object and a third server, and the secure multiparty computation protocol bases the calculation on object data of the object, wherein the object data is stored in the first server, and the method is executed by the third server and comprises: receiving from the first server the location in the blockchain ledger obtained through the method executed on the first server; and obtaining the ciphertext from the location in the blockchain ledger to be used as an input to the secure multiparty computation protocol.

In some embodiments, an apparatus for obtaining an input of a secure multiparty computation protocol is provided, wherein participants of the secure multiparty computation protocol include a first server which is the server of an object, and the secure multiparty computation protocol bases the calculation on object data of the object, wherein the object data is stored in a second server which is the server of an authorized organization, and the apparatus is implemented in the second server and comprises: a receiving unit configured for receiving a data request for the object data from the first server; a generation unit configured for performing homomorphic encryption of the object data using a public key received from the first server in advance based on the data request to generate a first ciphertext, wherein the public key is the public key of the object for homomorphic encryption; an obtaining unit configured for obtaining verification data based on the first ciphertext, wherein the verification data is used for verifying whether the ciphertext to be verified corresponds to the object data; and a sending unit configured for sending the verification data to the first server.

In one embodiment, in the apparatus for obtaining an input of a secure multiparty computation protocol, the data request contains a random number for homomorphic encryption of the object data, wherein the generation unit is also configured for performing homomorphic encryption of the object data using the public key received from the first server in advance and the random number to generate a first ciphertext.

In one embodiment, in the apparatus for obtaining an input of a secure multiparty computation protocol, the sending unit is also configured for sending the verification data and the first ciphertext to the first server.

In one embodiment, in the apparatus for obtaining an input of a secure multiparty computation protocol, the obtaining unit is also configured for storing the first ciphertext in a blockchain to obtain the storage location of the first ciphertext in the blockchain ledger to be used as the verification data.

In some embodiments, an apparatus for obtaining an input of a secure multiparty computation protocol is provided, wherein participants of the secure multiparty computation protocol include a first server which is the server of an object and a third server, and the secure multiparty computation protocol bases the calculation on object data of the object, wherein the object data is stored in a second server which is the server of an authorized organization, and the apparatus is implemented in the first server and comprises: a first sending unit configured for sending a data request for the object data to the second server; an obtaining unit configured for obtaining a second ciphertext corresponding to the object data, wherein the second ciphertext is the homomorphically encrypted ciphertext obtained through a public key of the object generated in advance; a receiving unit configured for receiving from the second server the verification data obtained through any of the methods executed by the second server; and a second sending unit configured for sending the second ciphertext and the verification data to the third server.

In one embodiment, in the apparatus for obtaining an input of a secure multiparty computation protocol, the obtaining unit is also configured for receiving from the second server the first ciphertext generated through the method executed by the second server to be used as the second ciphertext.

In one embodiment, in the apparatus for obtaining an input of a secure multiparty computation protocol, the first server stores the object data, and the obtaining unit is also configured for performing local homomorphic encryption of the object data using the public key and a random number generated locally to obtain the second ciphertext, wherein the data request for the object data contains the random number.

In some embodiments, an apparatus for obtaining an input of a secure multiparty computation protocol is provided, wherein participants of the secure multiparty computation protocol include a first server which is the server of an object and a third server, and the secure multiparty computation protocol bases the calculation on object data of the object, wherein the object data is stored in a second server which is the server of an authorized organization, and the apparatus is executed by the first server and comprises: a first sending unit configured for sending a data request for the object data to the second server; a receiving unit configured for receiving from the second server the storage location of the first ciphertext and the authorized organization's digital signature for the first ciphertext in the blockchain ledger; and a second sending unit configured for sending the location in the blockchain ledger to the third server.

In some embodiments, an apparatus for obtaining an input of a secure multiparty computation protocol is provided, wherein participants of the secure multiparty computation protocol include a first server which is the server of an object and a third server, and the secure multiparty computation protocol bases the calculation on object data of the object, wherein the object data is stored in the first server, and the apparatus is executed by the first server and comprises: an encryption unit configured for performing homomorphic encryption of the object data using a public key of the object generated in advance to obtain the ciphertext corresponding to the object data; a storage unit configured for storing the ciphertext in a blockchain to obtain the storage location of the ciphertext in the blockchain ledger; and a sending unit configured for sending the ciphertext and the location in the blockchain ledger to the third server.

In some embodiments, an apparatus for obtaining an input of a secure multiparty computation protocol is provided, wherein participants of the secure multiparty computation protocol include a first server which is the server of an object and a third server, and the secure multiparty computation protocol bases the calculation on object data of the object, wherein the object data is stored in the first server, and the apparatus is implemented in the first server and comprises: an encryption unit configured for performing homomorphic encryption of the object data using a public key of the object generated in advance to obtain the ciphertext corresponding to the object data; a storage unit configured for storing the ciphertext and a digital signature of the object to the ciphertext in a blockchain to obtain the storage locations of the ciphertext and the digital signature in the blockchain ledger, wherein the digital signature is generated by the first server; and a sending unit configured for sending the location in the blockchain ledger to the third server.

In some embodiments, an apparatus for obtaining an input of a secure multiparty computation protocol is provided, wherein participants of the secure multiparty computation protocol include a first server which is the server of an object and a third server, and the secure multiparty computation protocol bases the calculation on object data of the object, wherein the object data is stored in a second server which is the server of an authorized organization, and the apparatus is implemented in the third server and comprises: a receiving unit configured for receiving from the first server the second ciphertext and the verification data obtained through the method executed on the first server; a verification unit configured for verifying the second ciphertext using the verification data to determine whether the second ciphertext corresponds to the object data; and a determination unit configured for determining the second ciphertext as an input to the secure multiparty computation protocol when it is determined that the second ciphertext corresponds to the object data.

In one embodiment, in the apparatus for obtaining an input of a secure multiparty computation protocol, the verification data is the storage location of the first ciphertext and the authorized organization's digital signature for the first ciphertext in the blockchain ledger, wherein the first ciphertext obtained through the method executed by the second server is stored at the location in the blockchain ledger, wherein the verification unit further comprises: an obtaining sub-unit configured for obtaining the first ciphertext through the location in the blockchain ledger; and a determination sub-unit configured for determining whether the second ciphertext is the same as the first ciphertext.

In one embodiment, in the apparatus for obtaining an input of a secure multiparty computation protocol, the verification data is the storage location of a hash value of the first ciphertext and the authorized organization's digital signature for the hash value of the first ciphertext in the blockchain ledger, wherein the hash value of the first ciphertext generated based on the ciphertext through the second server is stored at the location in the blockchain ledger, wherein the verification unit comprises: an obtaining sub-unit configured for obtaining the hash value of the first ciphertext through the location in the blockchain ledger; and a determination sub-unit configured for determining whether the second ciphertext matches the hash value.

In one embodiment, in the apparatus for obtaining an input of a secure multiparty computation protocol, the verification data is the authorized organization's digital signature for the first ciphertext, wherein the verification unit further comprises: a determination sub-unit configured for determining whether the second ciphertext matches the digital signature.

In some embodiments, an apparatus for obtaining an input of a secure multiparty computation protocol is provided, wherein participants of the secure multiparty computation protocol include a first server which is the server of an object and a third server, and the secure multiparty computation protocol bases the calculation on object data of the object, wherein the object data is stored in a second server which is the server of an authorized organization, and the apparatus is implemented in the third server and comprises: a receiving unit configured for receiving from the first server the storage location of the first ciphertext and the authorized organization's digital signature for the first ciphertext in the blockchain ledger; and an obtaining unit configured for obtaining the first ciphertext from the location in the blockchain ledger to be used as an input to the secure multiparty computation protocol.

In some embodiments, an apparatus for obtaining an input of a secure multiparty computation protocol is provided, wherein participants of the secure multiparty computation protocol include a first server which is the server of an object and a third server, and the secure multiparty computation protocol bases the calculation on object data of the object, wherein the object data is stored in the first server, and the apparatus is implemented in the third server and comprises: a receiving unit configured for receiving from the first server the ciphertext and the location in the blockchain ledger obtained through the method executed on the first server; a verification unit configured for verifying the ciphertext using the location in the blockchain ledger to determine whether the ciphertext corresponds to the object data; and a determination unit configured for determining the ciphertext as an input to the secure multiparty computation protocol when it is determined that the ciphertext corresponds to the object data.

In some embodiments, an apparatus for obtaining an input of a secure multiparty computation protocol is provided, wherein participants of the secure multiparty computation protocol include a first server which is the server of an object and a third server, and the secure multiparty computation protocol bases the calculation on object data of the object, wherein the object data is stored in the first server, and the apparatus is implemented in the third server and comprises: a receiving unit configured for receiving from the first server the location in the blockchain ledger obtained through the method executed on the first server; and an obtaining unit configured for obtaining the ciphertext from the location in the blockchain ledger to be used as an input to the secure multiparty computation protocol.

In some embodiments, a computer device is provided, the computer device comprising a memory and a processor, characterized in that the memory stores executable codes which are executed by the processor to achieve any of the foregoing methods for obtaining an input of a secure multiparty computation protocol.

In some embodiments, a method for privacy protection is performed by a second computing device and comprises: receiving a data request for object data from a first computing device, wherein the object data is associated with an object and is stored in the second computing device; performing encryption of the object data using a public key associated with the object based on the data request to generate a first ciphertext; obtaining verification data based on the first ciphertext for verifying whether a ciphertext to be verified corresponds to the object data; and sending the verification data to the first computing device for the first computing device to execute a cryptography protocol with a third computing device based on the verification data.

In some embodiments, the data request contains a random number for homomorphic encryption of the object data; and performing encryption of the object data using the public key associated with the object based on the data request to generate the first ciphertext comprises performing homomorphic encryption of the object data using the public key received from the first computing device and the random number to generate the first ciphertext.

In some embodiments, sending the verification data to the first computing device comprises sending the verification data and the first ciphertext to the first computing device.

In some embodiments, obtaining the verification data based on the first ciphertext comprises storing the first ciphertext in a blockchain to obtain a storage location of the first ciphertext in the blockchain; and the verification data comprises the storage location.

In some embodiments, the second computing device is associated with an authorized organization; storing the first ciphertext in the blockchain comprises storing, at the storage location in the blockchain, the first ciphertext and the authorized organization's digital signature for the first ciphertext; and the authorized organization's digital signature is generated by the second computing device.

In some embodiments, the second computing device is associated with an authorized organization; storing the first ciphertext in the blockchain comprises storing, at the storage location in the blockchain, a hash value of the first ciphertext and the authorized organization's digital signature for the hash value; the hash value is generated by the second computing device based on the first ciphertext; and the authorized organization's digital signature is generated by the second computing device.

In some embodiments, the second computing device is associated with an authorized organization; obtaining the verification data based on the first ciphertext comprises generating the authorized organization's digital signature for the first ciphertext; and the verification data comprises the authorized organization's digital signature.

In some embodiments, sending the verification data to the first computing device for the first computing device to execute a cryptography protocol with a third computing device based on the verification data comprises sending the verification data to the first computing device for the first computing device to execute a secure multiparty computation protocol for the object data with the third computing device based on the verification data.

In some embodiments, sending the verification data to the first computing device for the first computing device to execute a secure multiparty computation protocol for the object data with the third computing device based on the verification data comprises: causing the third computing device to obtain and verify the first ciphertext based on the verification data and to determine the first ciphertext as an input to the secure multiparty computation protocol in response to determining that the first ciphertext corresponds to the object data.

In some embodiments, a system for privacy protection acts as a second computing device and comprises one or more processors and one or more non-transitory computer-readable memories coupled to the one or more processors and configured with instructions executable by the one or more processors to cause the system to perform operations comprising: receiving a data request for object data from a first computing device, wherein the object data is associated with an object and is stored in the second computing device; performing encryption of the object data using a public key associated with the object based on the data request to generate a first ciphertext; obtaining verification data based on the first ciphertext for verifying whether a ciphertext to be verified corresponds to the object data; and sending the verification data to the first computing device for the first computing device to execute a cryptography protocol with a third computing device based on the verification data.

In some embodiments, a non-transitory computer-readable storage medium for privacy protection is configured with instructions executable by one or more processors to cause the one or more processors to perform operations comprising: receiving a data request for object data from a first computing device, wherein the object data is associated with an object and is stored in the second computing device; performing encryption of the object data using a public key associated with the object based on the data request to generate a first ciphertext; obtaining verification data based on the first ciphertext for verifying whether a ciphertext to be verified corresponds to the object data; and sending the verification data to the first computing device for the first computing device to execute a cryptography protocol with a third computing device based on the verification data.

In some embodiments, a method for privacy protection is performed by a first computing device and comprises: sending a data request for object data to a second computing device, wherein the object data is associated with an object and is stored in the second computing device; obtaining a second ciphertext corresponding to the object data, wherein the second ciphertext is an encrypted ciphertext based on a public key of the object; receiving verification data from the second computing device; and sending the second ciphertext and the verification data to a third computing device to execute a cryptography protocol with the third computing device based on the verification data.

In some embodiments, the first computing device stores the object data; obtaining the second ciphertext corresponding to the object data comprises: generating a random number and performing homomorphic encryption of the object data using the public key and the generated random number to obtain the second ciphertext; and the data request for the object data comprises the random number.

In some embodiments, sending the data request for object data to the second computing device comprises: sending the data request for object data to the second computing device, for the second computing device to perform homomorphic encryption of the object data using a public key associated with the object based on the data request to generate a first ciphertext; and obtaining the second ciphertext corresponding to the object data comprises receiving from the second computing device the first ciphertext to use as the second ciphertext.

In some embodiments, the verification data comprises a storage location of the first ciphertext in a blockchain as stored by the second computing device; and sending the second ciphertext and the verification data to the third computing device comprises sending the second ciphertext and the storage location to the third computing device.

In some embodiments, sending the second ciphertext and the verification data to the third computing device to execute the cryptography protocol with the third computing device based on the verification data comprises sending the second ciphertext and the verification data to the third computing device to execute a secure multiparty computation protocol for the object data with the third computing device based on the verification data.

In some embodiments, sending the second ciphertext and the verification data to the third computing device to execute the secure multiparty computation protocol for the object data with the third computing device based on the verification data comprises: causing the third computing device to obtain and verify the second ciphertext based on the verification data and to determine the second ciphertext as an input to the secure multiparty computation protocol in response to determining that the second ciphertext corresponds to the object data.

In some embodiments, a system for privacy protection acts as a first computing device and comprises one or more processors and one or more non-transitory computer-readable memories coupled to the one or more processors and configured with instructions executable by the one or more processors to cause the system to perform operations comprising: sending a data request for object data to a second computing device, wherein the object data is associated with an object and is stored in the second computing device; obtaining a second ciphertext corresponding to the object data, wherein the second ciphertext is an encrypted ciphertext based on a public key of the object; receiving verification data from the second computing device; and sending the second ciphertext and the verification data to a third computing device to execute a cryptography protocol with the third computing device based on the verification data.

In some embodiments, a non-transitory computer-readable storage medium for privacy protection is configured with instructions executable by one or more processors to cause the one or more processors to perform operations comprising: sending a data request for object data to a second computing device, wherein the object data is associated with an object and is stored in the second computing device; obtaining a second ciphertext corresponding to the object data, wherein the second ciphertext is an encrypted ciphertext based on a public key of the object; receiving verification data from the second computing device; and sending the second ciphertext and the verification data to a third computing device to execute a cryptography protocol with the third computing device based on the verification data.

In some embodiments, a system for privacy protection comprises one or more processors and one or more computer-readable memories coupled to the one or more processors and having instructions stored thereon that are executable by the one or more processors to perform the method of any of the preceding embodiments.

In some embodiments, an apparatus for privacy protection comprises a plurality of modules for performing the method of any of the preceding embodiments.

In some embodiments, a non-transitory computer-readable medium having stored therein instructions that, when executed by a processor of a device, cause the device to perform the method of any of the preceding embodiments.

In various embodiments, through endorsing homomorphically encrypted ciphertext and using a secure multiparty computation protocol, the dilemma between data privacy and data credibility is resolved, obviating the use of zero-knowledge proof technology and expensive computation and storage consumption required by the zero-knowledge proof technology. In addition, the present embodiments can solve the problem of data falsification in evaluations involving multiple demonstrators' data.

BRIEF DESCRIPTION OF THE DRAWING

The embodiments of the present specification will become apparent through description in combination with the attached drawings.

DETAILED DESCRIPTION

The embodiments of the present specification will be described hereafter in combination with the attached drawings.

Figure 1:
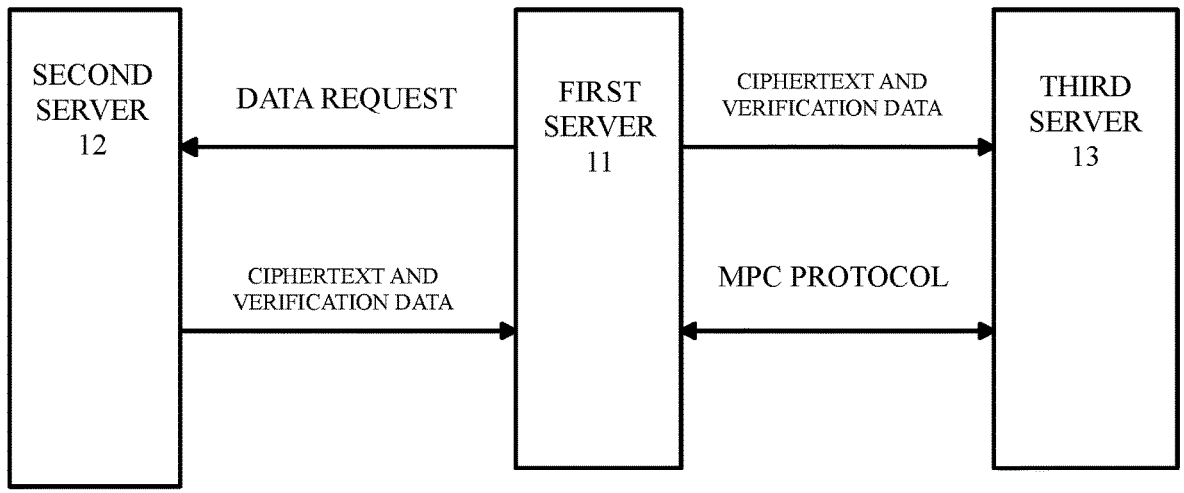
FIG. 1 is a scenario diagram of the secure multiparty computation according to some embodiments of the present specification.

FIG. 1 is a scenario diagram of the secure multiparty computation according to the embodiments of the present specification. As shown in FIG. 1, the participants of a secure multiparty computation include a first computing device, for example, a first server 11 and a third computing device, for example, a third server 13, wherein the first server 11 is the server of a demonstrator which is an individual, an enterprise, an organization, etc., and the third server 13 is the server of a validator which may be an individual, an enterprise, an organization, etc. providing service to the demonstrator. The scenario also includes a second computing device, for example, a second server 12, which is, for example, the server of a bank, a tax bureau, and another authorized organization. The second server stores the data of the demonstrator. Before the first server 11 and the third server 13 execute the secure multiparty computation (MPC) agreement, the first server 11 sends a data request to the second server 12, and the data request contains the request for the ciphertext of the demonstrator's specific data and the endorsement certificate of the demonstrator's specific data. After receiving the data request above, the second server encrypts the specific data by using the public key of the demonstrator for homomorphic encryption provided by the demonstrator in advance to generate homomorphically encrypted ciphertext and generate verification data based on the homomorphically encrypted ciphertext. The verification data is used for demonstrating whether the ciphertext to be verified corresponds to the specific data. Then, the second server sends the ciphertext and the verification data to the first server.

The first server 11 sends the received ciphertext and verification data to the third server 13. The third server 13 verifies the ciphertext using the verification data. When determining that the ciphertext corresponds to the specific data, the ciphertext is determined to be the input of a secure multiparty computation protocol. When determining that the ciphertext does not correspond to the specific data, the MPC protocol is terminated.

The scenario of the secure multi-party computation shown in FIG. 1 is merely illustrative, and the scenario of the embodiments of the present specification is not limited to that shown in FIG. 1. For example, the first server 11 may generate the ciphertext of the object data by itself instead of receiving the ciphertext from the second server. For another example, the third server may download credible ciphertext from the blockchain by itself instead of receiving the ciphertext from the first server. In addition, the secure multiparty computation is not limited to two parties, and may include any number of participants. The demonstrator may also obtain endorsement certificates from multiple endorsers. Besides, the demonstrator itself may be an endorser, that is, it may perform endorsement for itself, and the demonstrator may also be a validator.

Figure 2:
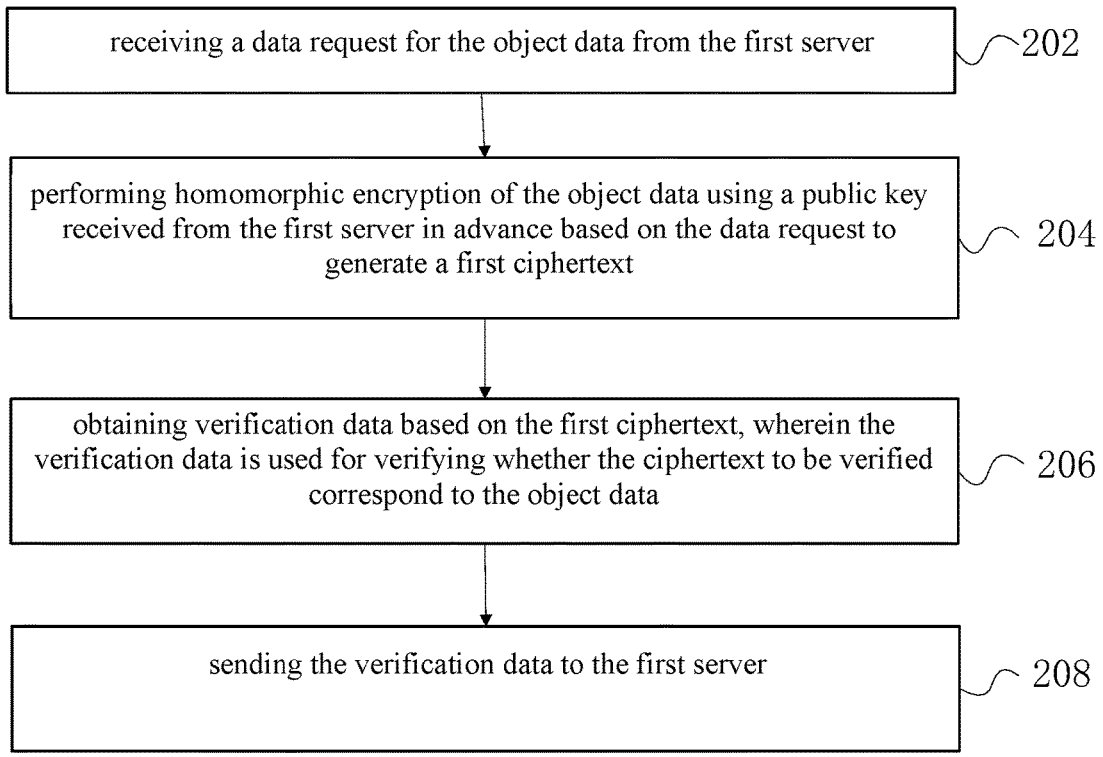
FIG. 2 is a flow chart of a method for obtaining an input of a secure multiparty computation protocol according to some embodiments of the present specification.

FIG. 2 illustrates a method for obtaining an input of a secure multiparty computation protocol according to some embodiments of the present specification. The participants of the secure multiparty computation protocol include a first server which is the server of an object, and the secure multiparty computation protocol bases the calculation on object data of the object, wherein the object data is stored in a second server which is the server of an authorized organization. In some embodiments, the method is performed by a second computing device (e.g., second server) and includes: receiving a data request for object data from a first computing device (e.g., first server), wherein the object data is associated with an object and is stored in the second computing device; performing encryption of the object data using a public key associated with the object based on the data request to generate a first ciphertext; obtaining verification data based on the first ciphertext for verifying whether a ciphertext to be verified corresponds to the object data; and sending the verification data to the first computing device for the first computing device to execute a cryptography protocol with a third computing device (e.g., third server) based on the verification data.

In some embodiments, the method is executed by the second server and comprises the following steps.

Step S202, receiving a data request for the object data from the first server;

Step S204, performing homomorphic encryption of the object data using a public key received from the first server in advance based on the data request to generate a first ciphertext, wherein the public key is the public key of the object for homomorphic encryption;

Step S206, obtaining verification data based on the first ciphertext, wherein the verification data is used for verifying whether the ciphertext to be verified corresponds to the object data; and Step S208, sending the verification data to the first server.

First, Step S202, receiving a data request for the object data from the first server. For example, the first server is the server of an individual or an enterprise, which, for example, performs a MPC protocol with the third server as shown in FIG. 1, wherein the third server is, for example, an evaluation institution, a lending institution, an insurance company, and the like. The first server and the third server perform the MPC protocol, so that the third server obtains the evaluation result of the object (the individual or the enterprise), and protects the privacy data of the object against the third server. The second server is, for example, the server of a bank, in which data of the object, such as age, gender, savings, income, and the like, is stored. The data request specifies the data to be processed (that is, the object data). For example, the object data is the savings of the object, and the first server specifies the savings data in the data request. The data request may also contain specifying an encryption method for the data, that is, specifying homomorphic encryption of the data by the public key of the object. In addition, the data request may further contain specifying the contents that should be sent back by the second server, for example, specifying sending back the ciphertext of the data and the verification data of the ciphertext, or the verification data of the ciphertext, etc.

Step S204, performing homomorphic encryption of the object data using a public key received from the first server in advance based on the data request to generate a first ciphertext, wherein the public key is the public key of the object for homomorphic encryption. After determining the specific encryption of the object data according to the data request, the second server obtains the object data and the public key of the object from its own storage unit, and performs homomorphic encryption of the object data using the public key of the object to obtain the first ciphertext. In some embodiments, a public-private key pair of homomorphic cryptographic of the object is generated by the first server in advance, and after generating the public-private key pair, the first server sends the public key to the second server for implementing the methods according to the embodiments of the present specification.

In one embodiment, the first server also stores the object data. The first server performs homomorphic encryption of the object data to obtain a second ciphertext by using its own public key for homomorphic encryption, the object data, and a locally generated random number. Thus, when the first server sends the data request to the second server, the random number is contained in the data request. Thus, the second server may perform homomorphic encryption of the object data to generate a first ciphertext by using the public key received from the first server in advance and the random number. That is, by sending the random number, the first ciphertext generated in the second server is consistent with the second ciphertext generated in the first server so as to be used for executing the subsequent method.

Step S206, obtaining verification data based on the first ciphertext, wherein the verification data is used for verifying whether the ciphertext to be verified corresponds to the object data.

In one embodiment, the verification data is the location in the blockchain ledger where the authorized organization stores the first ciphertext in a blockchain. For example, after generating the first ciphertext, the second server generates the authorized organization's digital signature for the first ciphertext, and stores the first ciphertext and the digital signature in the blockchain. For example, the second server calculates the first ciphertext using the private key of the authorized organization to generate encrypted data to be used as the authorized organization's digital signature for the first ciphertext. The authorized organization's digital signature shows the authorized organization's endorsement certificate of the following: the first ciphertext is the ciphertext obtained by homomorphic encryption of the object data using the public key of the first server. In addition, other nodes in the blockchain reach a consensus after verifying the authorized organization's digital signature with the public key of the authorized organization, and store the first ciphertext and the digital signature in the blockchain, thereby ensuring that the first ciphertext is not falsified and is complete, and at the same time ensuring the authenticity of the digital signature. Therefore, by obtaining the location of the blockchain ledger, the first ciphertext can be obtained from the location, and the first ciphertext is compared with the ciphertext to be verified to determine whether the ciphertext to be verified corresponds to the object data. That is, the location in the blockchain ledger can be used as verification data for verifying whether the ciphertext to be verified corresponds to the object data.

In some embodiments, the second server may further store a hash value of the first ciphertext and the authorized organization's digital signature for the hash value in the blockchain, so as to obtain the storage location of the hash value in the blockchain ledger. Similarly, the authorized organization gives an endorsement certificate of the hash value through its digital signature, that is, gives an endorsement certificate of its corresponding first ciphertext. Therefore, by obtaining the location of the blockchain ledger, the hash value of the first ciphertext can be obtained from the location, and the hash value of the ciphertext to be verified is compared with the hash value of the first ciphertext to determine whether the ciphertext to be verified corresponds to the object data.

In one embodiment, the verification data is the authorized organization's digital signature for the first ciphertext generated by the second server. For example, after generating the first ciphertext as described above, the second server calculates the first ciphertext using the private key of the authorized organization to generate encrypted data to be used as the authorized organization's digital signature for the first ciphertext. The digital signature can be verified by the public key of the authorized organization, and it can ensure that the first ciphertext is not to be tampered with and is complete, manifesting the authorized organization's endorsement certificate of the first ciphertext. Therefore, by obtaining the digital signature, the public key of the authorized organization is used to verify whether the ciphertext to be verified matches the digital signature, thereby determining whether the ciphertext to be verified corresponds to the object data.

Step S208, sending the verification data to the first server.

In one embodiment, for example, for the foregoing description of Step S204, the first server locally generates a second ciphertext by itself, so that the second server only needs to send the verification data to the first server for use in a subsequent method. In another embodiment, after the second server generates the first ciphertext, the random number generated by the second server is sent to the first server, so that the first server can utilize the random number and locally stored object data to locally generate the first ciphertext corresponding to the object data, that is, the second server needs to send the verification data and the random number used to generate the first ciphertext to the first server. In another embodiment, the second server sends the first ciphertext and the verification data to the first server for use in a subsequent method.

Figure 3:
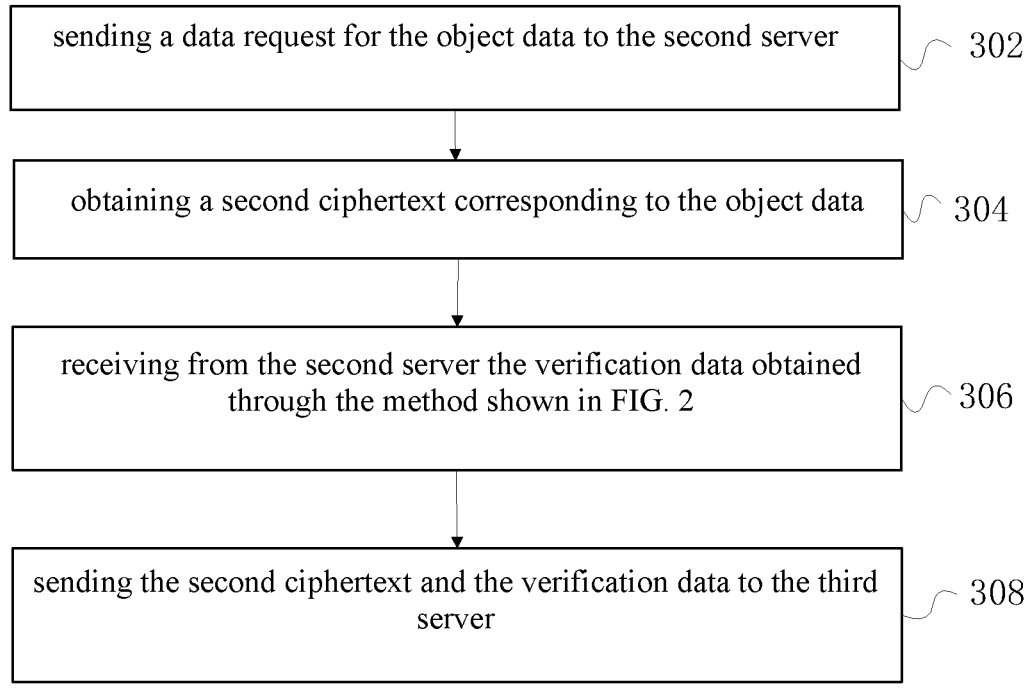
FIG. 3 is a flow chart of a method for obtaining an input of a secure multiparty computation protocol according to some embodiments of the present specification.

FIG. 3 is a flow chart of a method for obtaining an input of a secure multiparty computation protocol according to another embodiment of the present specification. The participants of the secure multiparty computation protocol include a first server which is the server of an object and a third server. The secure multiparty computation protocol bases the calculation on object data of the object, wherein the object data is stored in a second server which is the server of an authorized organization. In some embodiments, a method for privacy protection is performed by a first computing device (e.g., first server) and comprises: sending a data request for object data to a second computing device, wherein the object data is associated with an object and is stored in the second computing device (e.g., second server); obtaining a second ciphertext corresponding to the object data, wherein the second ciphertext is an encrypted ciphertext based on a public key of the object; receiving verification data from the second computing device; and sending the second ciphertext and the verification data to a third computing device (e.g., third server) to execute a cryptography protocol with the third computing device based on the verification data.

In some embodiments, the method executed by the first server comprises the following Steps S302-S306.

Step S302, sending a data request for the object data to the second server. For a detailed description of the data request in this step, reference may be made to the foregoing description of Step S202 in FIG. 2, so no detailed descriptions are given here.

Step S304, obtaining a second ciphertext corresponding to the object data, wherein the second ciphertext is the homomorphically encrypted ciphertext obtained through a public key of the object generated in advance.

In the first server, a public-private key pair of the object for homomorphic encryption of the data is generated in advance. And, the first server sends the public key therein to the second server in advance for implementation of the method of the embodiment.

In one embodiment, the first ciphertext is received from the second server to be used as the second ciphertext. Wherein the first ciphertext is generated by the second server which performs homomorphic encryption of the object data using the public key received from the first server in advance.

In one embodiment, the first server locally stores the object data. The first server locally performs homomorphic encryption of the object data using the public key and the random number to obtain the second ciphertext. In this case, the data request for the object data contains the random number, so that the second server can generate the first ciphertext according to the public key and the random number. Thereby, the first ciphertext and the second ciphertext are the same.

In another embodiment, the first server locally stores the object data. After generating the first ciphertext using the public key of the object and the second random number generated locally by the second server, the second server sends the second random number to the first server. Thus, the first server locally generates the second ciphertext using the public key and the second random number.

Step S306, receiving from the second server the verification data obtained through the method shown in FIG. 2. As described above, the verification data obtained through the method executed by the second server comprises: the storage location of the first ciphertext in the blockchain ledger and the authorized organization's digital signature for the first ciphertext.

Step S308, sending the second ciphertext and the verification data to the third server. For the step of sending the second ciphertext and the verification data to the third server, the third server can verify the second ciphertext using the verification data as described above to determine whether the second ciphertext corresponds to the object data. Thus, the second ciphertext can be determined as an input to the MPC protocol where the second ciphertext corresponds to the object data. That is, the second ciphertext is a creditable input and corresponds to the true data of the object.

Figure 4:
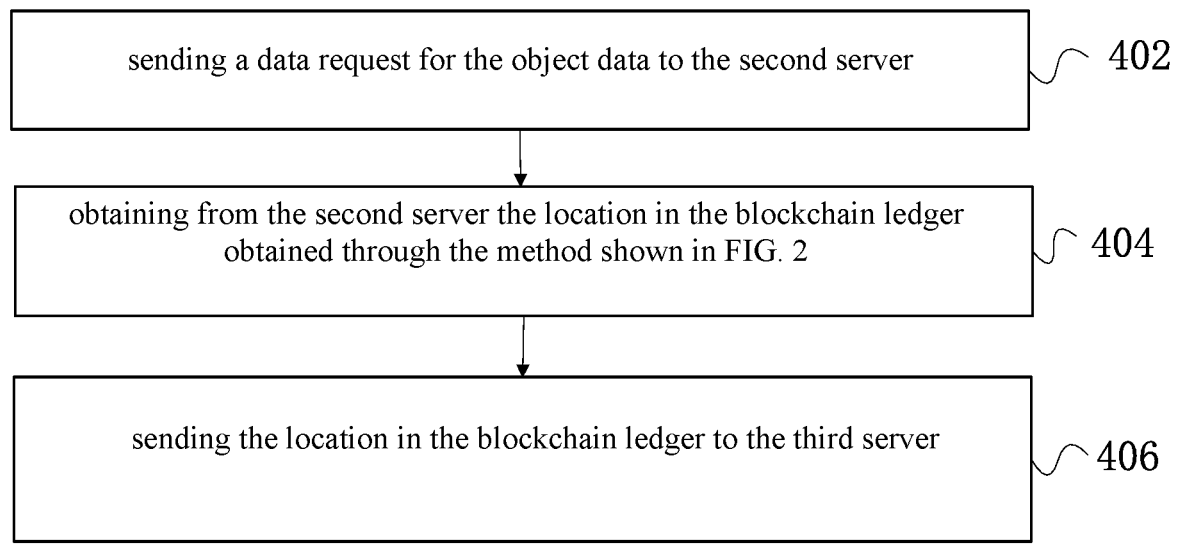
FIG. 4 is a flow chart of a method for obtaining an input of a secure multiparty computation protocol according to some embodiments of the present specification.

FIG. 4 is a flow chart of a method for obtaining an input of a secure multiparty computation protocol according to another embodiment of the present specification. The participants of the secure multiparty computation protocol include a first server which is the server of an object and a third server, and the secure multiparty computation protocol bases the calculation on the object data of the object, wherein the object data is stored in a second server which is the server of an authorized organization. The method executed by the first server comprises the following Steps S402-S406.

Step S402, sending a data request for the object data to the second server. For a detailed description of the data request in this step, reference may be made to the foregoing description of Step S202 in FIG. 2, so no detailed descriptions are given here.

Step S404, obtaining from the second server the location in the blockchain ledger obtained through the method shown in FIG. 2, wherein the first ciphertext corresponding to the object data and the authorized organization's digital signature for the first ciphertext are stored at the location in the blockchain ledger. Referring to the foregoing description of Step S206 of FIG. 2, by encrypting local object data to obtain first ciphertext, generating a digital signature for the first ciphertext, and storing the first ciphertext and the digital signature in the blockchain, the second server gives its endorsement certificate of the first ciphertext to show that the first ciphertext stored at the location in the blockchain ledger is a credible ciphertext corresponding to the object data.

Step S406, sending the location in the blockchain ledger to the third server. For the step of sending the location in the blockchain ledger to the third server, the third server can directly download the credible ciphertext corresponding to the object data from the location in the blockchain ledger, so as to use the ciphertext as an input of the MPC protocol.

Figure 5:
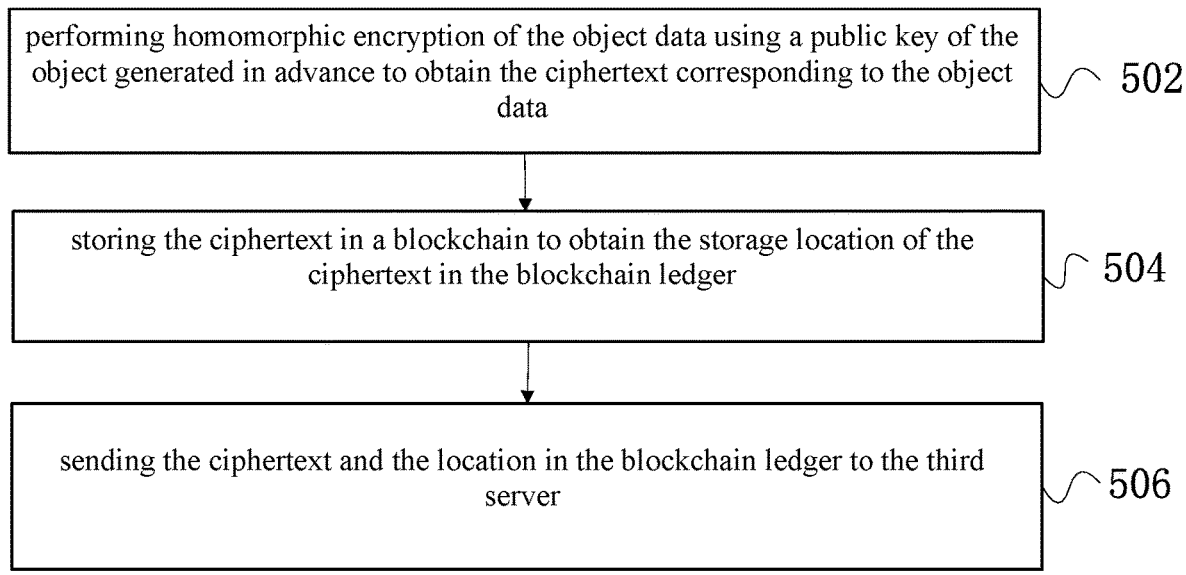
FIG. 5 is a flow chart of a method for obtaining an input of a secure multiparty computation protocol according to some embodiments of the present specification.

FIG. 5 is a flow chart of a method for obtaining an input of a secure multiparty computation protocol according to another embodiment of the present specification. The participants of the secure multiparty computation protocol include a first server which is the server of an object and a third server, and the secure multiparty computation protocol bases the calculation on object data of the object, wherein the object data is stored in the first server. This embodiment differs from the previous embodiments in that the object is both an object to be evaluated and an authorized organization which performs endorsement for itself. For example, the first server is the server of a bank, that is, the first server side is also the second server. The method executed by the first server comprises the following Steps S502-S506.

Step S502, performing homomorphic encryption of the object data using a public key of the object generated in advance to obtain the ciphertext corresponding to the object data. That is, the first server performs homomorphic encryption of local object data using the public key of the object for homomorphic encryption, thereby locally generating the ciphertext corresponding to the object data.

Step S504, storing the ciphertext in a blockchain to obtain the storage location of the ciphertext in the blockchain ledger. In some embodiments, similar to the foregoing description of Step S206 in FIG. 2, the location in the blockchain ledger here is one example of the verification data in Step S206 above. The difference is that in the embodiment shown in FIG. 2, the ciphertext is stored in the blockchain by the second server. In this embodiment, since the object is both an object to be evaluated and an authorized organization, the first server also serves as the second server. Therefore, in this embodiment, the ciphertext is stored by the first server. For a description of the specific process of the storage, reference may be made to the foregoing description of Step S206, so no detailed descriptions are given here.

Step S506, sending the ciphertext and the location in the blockchain ledger to the third server. For the specific implementation of this step, reference may be made to the foregoing description of Step S308 in FIG. 3, so no detailed descriptions are given here.

In this embodiment, for the step that the first server stores the ciphertext in the blockchain, the object performs endorsement for itself. In some embodiments, consensus verification may be performed for the data ciphertext of the object, and it is ensured that the ciphertext cannot be tampered with through the consensus in the blockchain, thus enhancing the credibility of the ciphertext.

Figure 6:
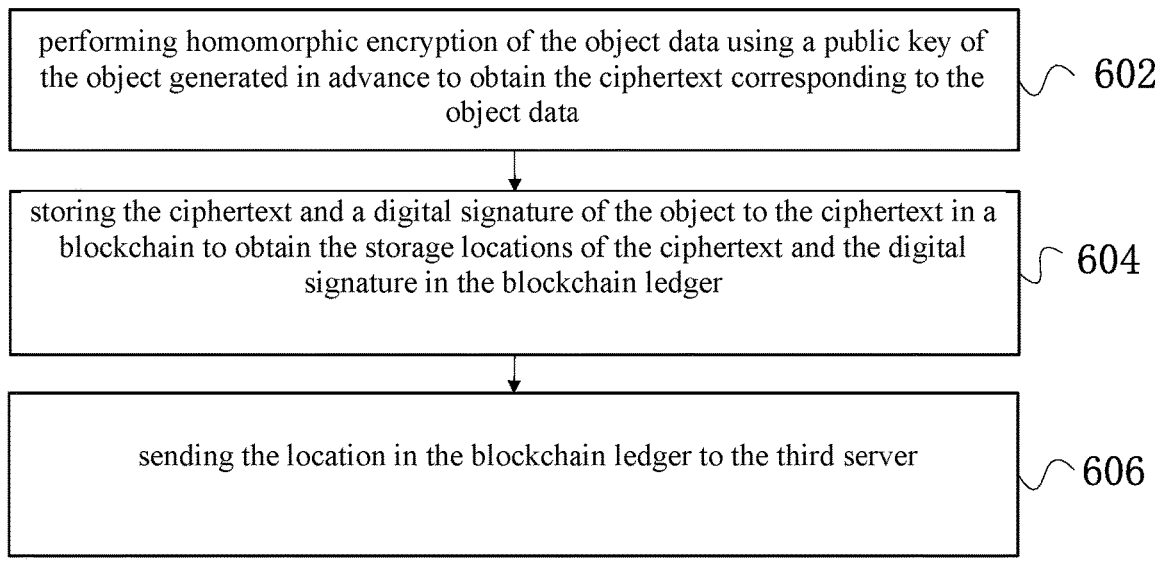
FIG. 6 is a flow chart of a method for obtaining an input of a secure multiparty computation protocol according to some embodiments of the present specification.

FIG. 6 illustrates a method for obtaining an input of a secure multiparty computation protocol according to another embodiment of the present specification. The participants of the secure multiparty computation protocol include a first server which is the server of an object and a third server, and the secure multiparty computation protocol bases the calculation on object data of the object, wherein the object data is stored in the first server. This embodiment is similar to that shown in FIG. 5, that is, since the object is both an object to be evaluated and an authorized organization, the first server is also the second server. The difference is that, in this embodiment, similar to the embodiment shown in FIG. 3, the third server obtains the ciphertext from the location in the blockchain ledger. The method executed by the first server comprises the following Steps S602-S606.

Step S602, performing homomorphic encryption of the object data using a public key of the object generated in advance to obtain the ciphertext corresponding to the object data. For the specific implementation of this step, reference may be made to the foregoing description of Step S502 in FIG. 5, so no detailed descriptions are given here.

Step S604, storing the ciphertext and a digital signature of the object to the ciphertext in a blockchain to obtain the storage locations of the ciphertext and the digital signature in the blockchain ledger, wherein the digital signature is generated by the first server. In some embodiments, the first server stores the ciphertext and the object's digital signature for the ciphertext in the blockchain, so that consensus verification is performed for the ciphertext and its digital signature in the blockchain, ensuring that the ciphertext cannot be tampered with.

Step S606, sending the location in the blockchain ledger to the third server. For the step of sending the location in the blockchain ledger to the third server, the third server can download the ciphertext from the blockchain, thereby ensuring the credibility of the ciphertext.

Figure 7:
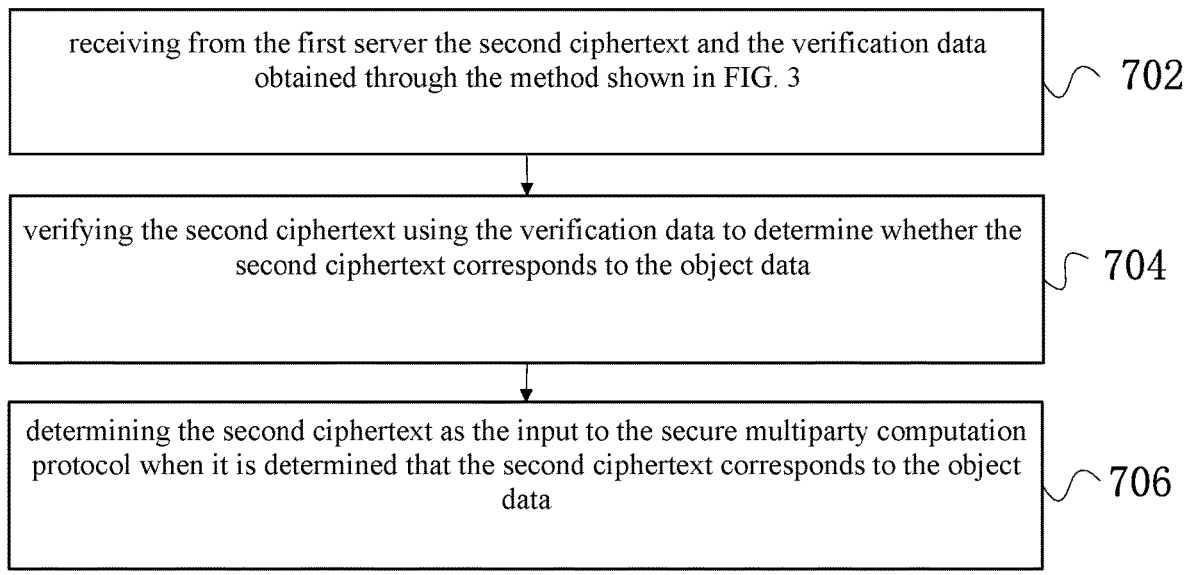
FIG. 7 illustrates a method for obtaining an input of a secure multiparty computation protocol according to some embodiments of the present specification.

FIG. 7 illustrates a method for obtaining an input of a secure multiparty computation protocol according to another embodiment of the present specification. The participants of the secure multiparty computation protocol include a first server which is the server of an object and a third server, and the secure multiparty computation protocol bases the calculation on the object data of the object, wherein the object data is stored in a second server which is the server of an authorized organization. The method executed by the third server comprises the following Steps S702-S706.

First, in Step S702, receiving from the first server the second ciphertext and the verification data obtained through the method shown in FIG. 3. In some embodiments, for a detailed description of the second ciphertext and the verification data, reference may be made to the foregoing description of Steps S304 and S306 in FIG. 3, so no detailed descriptions are given here.

Step S704, verifying the second ciphertext using the verification data to determine whether the second ciphertext corresponds to the object data.

In one embodiment, the verification data is the storage location of the first ciphertext in the blockchain ledger. In this case, the step of verifying the second ciphertext using the verification data comprises: obtaining the first ciphertext through the location in the blockchain ledger; and determining whether the second ciphertext is the same as the first ciphertext. Where the second ciphertext is the same as the first ciphertext, it can be determined that the second ciphertext corresponds to the object data.

In one embodiment, the verification data is the storage location of the hash value of the first ciphertext in the blockchain ledger. In this case, the step of verifying the second ciphertext using the verification data comprises: obtaining the hash value of the first ciphertext through the location in the blockchain ledger; and determining whether the second ciphertext matches the hash value, that is, determining whether the hash value of the second ciphertext is the same as the hash value of the first ciphertext. When the second ciphertext matches the hash value, it can be determined that the second ciphertext corresponds to the object data.

In one embodiment, the verification data is the authorized organization's digital signature for the first ciphertext, and in this case, the step of verifying the second ciphertext using the verification data comprises: determining whether the second ciphertext matches the digital signature. For example, a third server decrypts the digital signature using the public key of an authorized organization obtained from a second server in advance to obtain a first message digest, and calculates a second message digest from the second ciphertext using a hash function obtained from the second server. If the second message digest is the same as the first message digest, it may be determined that the second ciphertext matches the digital signature, that is, it may be determined that the second ciphertext corresponds to the object data.

Step S706, determining the second ciphertext as an input to the secure multiparty computation protocol when it is determined that the second ciphertext corresponds to the object data. When it is determined that the second ciphertext corresponds to the object data, it is determined that the second ciphertext is the ciphertext obtained through homomorphic encryption of the object data using the public key of the object. So, the ciphertext can be used in the MPC protocol, and it is ensured that true and credible results are obtained through the MPC protocol.

Figure 8:
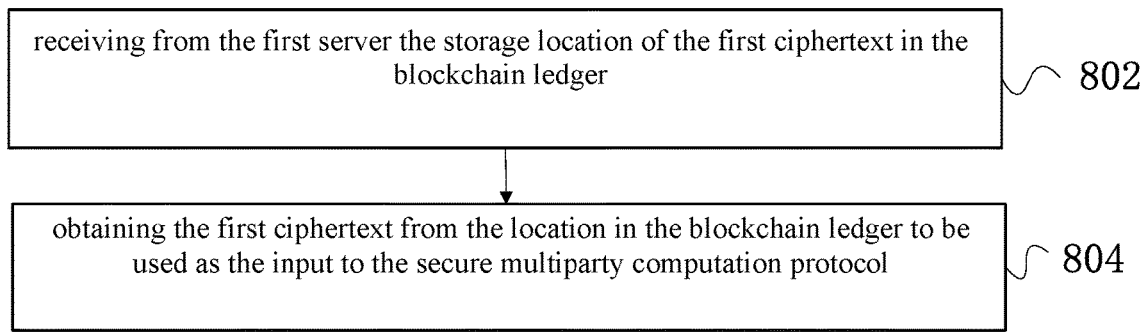
FIG. 8 illustrates a method for obtaining an input of a secure multiparty computation protocol according to some embodiments of the present specification.

FIG. 8 illustrates a method for obtaining an input of a secure multiparty computation protocol according to another embodiment of the present specification. The participants of the secure multiparty computation protocol include a first server which is the server of an object and a third server, and the secure multiparty computation protocol bases the calculation on object data of the object, wherein the object data is stored in a second server which is the server of an authorized organization. The method executed by the third server comprises the following Steps S802-S804.

First, Step S802, receiving from the first server the storage location of the first ciphertext in the blockchain ledger.

Step S804, obtaining the first ciphertext from the location in the blockchain ledger to be used as an input to the secure multiparty computation protocol.

This embodiment differs from the embodiment shown in FIG. 7 in that, in this embodiment, the first ciphertext is downloaded and obtained directly from the location in the blockchain ledger to be used as the second ciphertext in the embodiment shown in FIG. 7, obviating the need of receiving the second ciphertext from the first server. Since the first ciphertext corresponds to the object data as demonstrated by the authorized organization's endorsement, and is obtained by homomorphic encryption using the public key of the object, it can be used in the MPC protocol between the first server and the third server and ensure that true and credible calculation results are obtained.

Figure 9:
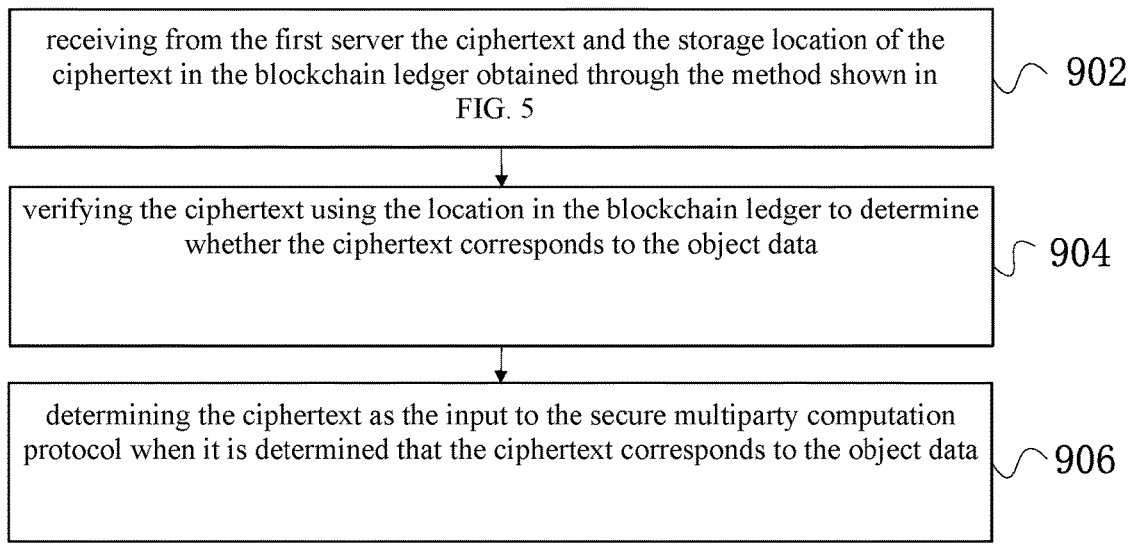
FIG. 9 illustrates a method for obtaining an input of a secure multiparty computation protocol according to some embodiments of the present specification.

FIG. 9 illustrates a method for obtaining an input of a secure multiparty computation protocol according to another embodiment of the present specification. The participants of the secure multiparty computation protocol include a first server which is the server of an object and a third server. The secure multiparty computation protocol bases the calculation on object data of the object, wherein the object data is stored in the first server. The method executed by the third server comprises the following Steps S902-S906.

First, in Step S902, receiving from the first server the ciphertext and the storage location of the ciphertext in the blockchain ledger obtained through the method shown in FIG. 5. For a detailed description of the ciphertext and the location in the blockchain ledger, reference may be made to the foregoing description of Steps S502 and S504 in FIG. 5, so no detailed descriptions are given here.

Step S904, verifying the ciphertext using the location in the blockchain ledger to determine whether the ciphertext corresponds to the object data. For the specific implementation of this step, reference may be made to the corresponding description in the foregoing description of Step S704 in FIG. 7, so no detailed descriptions are given here.

Step S906, determining the ciphertext as an input to the secure multiparty computation protocol when it is determined that the ciphertext corresponds to the object data. For the specific implementation of this step, reference may be made to the foregoing description of Step S706 in FIG. 7, so no detailed descriptions are given here.

The method illustrated in this embodiment differs from that shown in FIG. 7 in that, in this embodiment, the step that the first server sends the ciphertext in the blockchain enables the object to perform endorsement for itself. In some embodiments, consensus verification may be performed for the data ciphertext of the object, and it is ensured that the ciphertext cannot be tampered with through the consensus in the blockchain, thus enhancing the credibility of the ciphertext.

Figure 10:
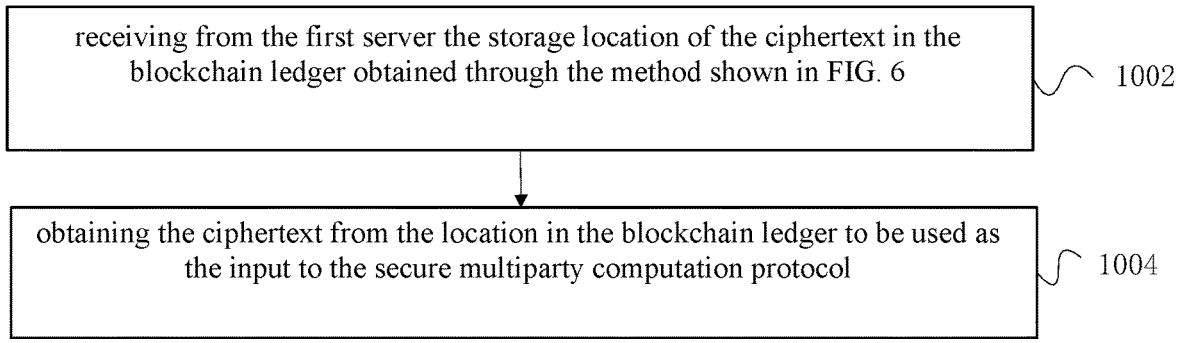
FIG. 10 illustrates a method for obtaining an input of a secure multiparty computation protocol according to some embodiments of the present specification.

FIG. 10 illustrates a method for obtaining an input of a secure multiparty computation protocol according to another embodiment of the present specification. The participants of the secure multiparty computation protocol include a first server which is the server of an object and a third server. The secure multiparty computation protocol bases the calculation on object data of the object, wherein the object data is stored in the first server. The method executed by the third server comprises the following Steps S1002-S1004.

First, in Step S1002, receiving from the first server the storage location of the ciphertext in the blockchain ledger obtained through the method shown in FIG. 6.

Step S1004, obtaining the ciphertext from the location in the blockchain ledger to be used as an input to the secure multiparty computation protocol.

This embodiment differs from the embodiment shown in FIG. 9 in that, in this embodiment, the ciphertext is downloaded and obtained directly from the location in the blockchain ledger, obviating the need of receiving the ciphertext from the first server. Since the ciphertext corresponds to the object data as demonstrated by the authorized organization's endorsement, and is obtained by homomorphic encryption using the public key of the object, it can be used in the MPC protocol between the first server and the third server and ensure that true and credible calculation results are obtained.

Figure 11:
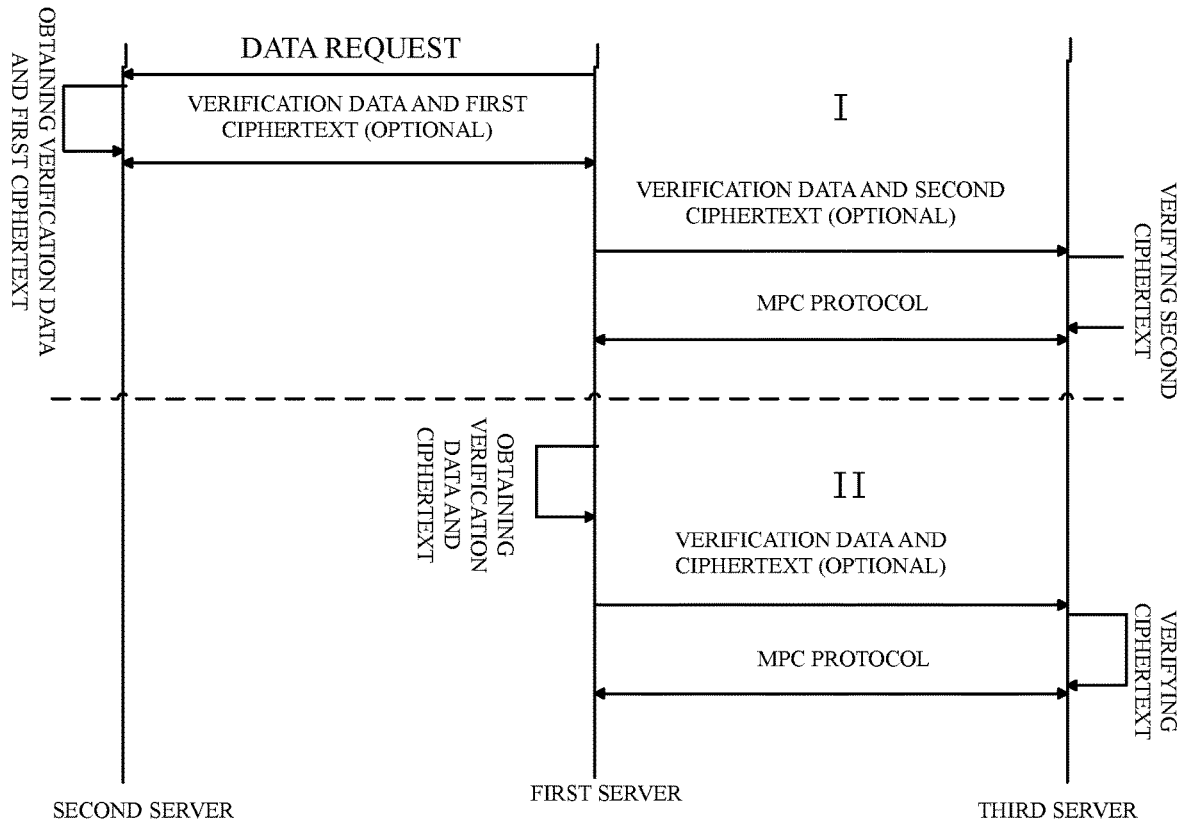
FIG. 11 illustrates a timing diagram of the methods according to some embodiments of the present specification.

FIG. 11 illustrates a timing diagram of the methods according to the embodiments of the present specification. FIG. 11 includes Part I and Part II, wherein Part I corresponds to the case where a first server obtains verification data from the second server of an authorized organization, and Part II corresponds to the case that a first server prepares the verification data by itself (that is, the second server of the authorized organization is not required). In Part I, the first server sends a data request to the second server, and the second server prepares the first ciphertext and the verification data according to the data request, and sends the verification data to the first server, and optionally, also sends the first ciphertext to the first server. Then, the first server sends second ciphertext (optional) and the verification data to the third server. Thus, the third server verifies the second ciphertext with the verification data to determine whether to use the second ciphertext as an input of the MPC protocol. In some embodiments, the second ciphertext may be the first ciphertext obtained from the second server, or ciphertext generated locally using the local public key and the object data. Optionally, the first server sends only the verification data to the third server, wherein the verification data is the location in the blockchain ledger where the authorized organization stores the first ciphertext in the blockchain, so that the third server can download the first ciphertext directly from the location in the blockchain ledger to be used in the MPC protocol.

In Part II, the first server locally generates the homomorphically encrypted ciphertext of the object data and stores the ciphertext in a blockchain to obtain the storage location of the ciphertext in the blockchain ledger as the verification data. Then, the first server sends the ciphertext (optional) and the location in the blockchain ledger to the third server. Thus, the third server verifies the ciphertext with the location in the blockchain ledger to determine whether to use the ciphertext as an input of the MPC protocol. Optionally, the first server sends only the location in the blockchain ledger to the third server, so that the third server can download the ciphertext directly from the location in the blockchain ledger as an input of the MPC protocol.

In the various embodiments above, the methods for obtaining an input of the MPC protocol performed between the first server, the second server, and the third server, or between the first server and the third server are illustrated, wherein the participants of the MPC protocol include a first server and a third server. However, the embodiments above are not intended to limit the scope of the present specification.

In one embodiment, a first server may obtain verification data and ciphertext (optional) from the servers of more than two authorized organizations (e.g., a bank and a tax bureaus). In this case, the first server may execute the method shown in FIG. 3 with the server of each authorized organization to obtain an input of the MPC protocol respectively.

In one embodiment, the methods executed by the first server and the third server are exchangeable, that is, the demonstrator of the first server may also be a validator, and the validator of the third server may also be a demonstrator. For example, the two parties in cooperation evaluate each other, and therefore, the method according to the foregoing embodiments will be executed twice between the two, with one party as the demonstrator and the other as the validator in one execution, and the roles exchanged in the other execution. The two executions may be simultaneously performed or sequentially performed. In the two executions, the methods may be the same or different (for example, the method shown in FIG. 3 is executed in one execution, and the method shown in FIG. 4 is executed in the other execution).

In one embodiment, the third server (validator) performs ciphertext verification for more than two demonstrator servers to separately obtain an input of the MPC protocol from each demonstrator. In this case, the third server executes a method, such as that shown in FIG. 3, with each of the demonstrator servers separately obtaining an input of the MPC protocol.

In one embodiment, the first server (demonstrator) provides the ciphertext of the object data and its verification data to multiple validator servers. In this case, the first server may send the ciphertext and the verification data obtained through the methods shown in the foregoing embodiments to each of the validator servers to separately obtain an input of the MPC protocol corresponding to each validator server.

Figure 12:
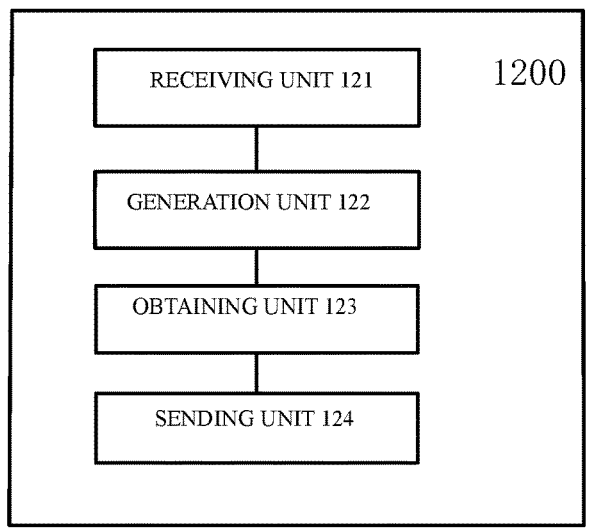
FIG. 12 illustrates an apparatus 1200 for obtaining an input of a secure multiparty computation protocol according to some embodiments of the present specification.

FIG. 12 illustrates an apparatus 1200 for obtaining an input of a secure multiparty computation protocol according to one embodiment of the present specification. The participants of the secure multiparty computation protocol include a first server which is the server of an object. The secure multiparty computation protocol bases the calculation on object data of the object, wherein the object data is stored in a second server which is the server of an authorized organization, and the apparatus is implemented in the second server and comprises: a receiving unit 121 configured for receiving a data request for the object data from the first server; a generation unit 122 configured for performing homomorphic encryption of the object data using a public key received from the first server in advance based on the data request to generate a first ciphertext, wherein the public key is the public key of the object for homomorphic encryption; an obtaining unit 123 configured for obtaining verification data based on the first ciphertext, wherein the verification data is used for verifying whether the ciphertext to be verified corresponds to the object data; and a sending unit 124 configured for sending the verification data to the first server.

In one embodiment, in the apparatus for obtaining an input of a secure multiparty computation protocol, the data request also contains a random number for homomorphic encryption of the object data, wherein the generation unit is also configured for performing homomorphic encryption of the object data using the public key received from the first server in advance and the random number to generate a first ciphertext.

In one embodiment, in the apparatus for obtaining an input of a secure multiparty computation protocol, the sending unit is also configured for sending the verification data and the first ciphertext to the first server.

In one embodiment, in the apparatus for obtaining an input of a secure multiparty computation protocol, the obtaining unit is also configured for storing the first ciphertext in a blockchain to obtain the storage location of the first ciphertext in the blockchain ledger to be used as the verification data.

Figure 13:
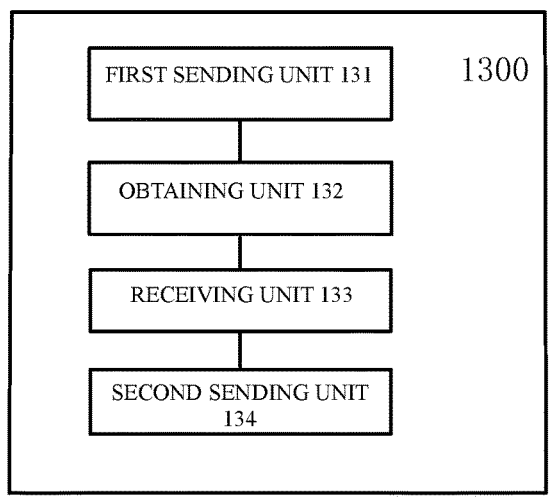
FIG. 13 illustrates an apparatus 1300 for obtaining an input of a secure multiparty computation protocol according to some embodiments of the present specification.

FIG. 13 illustrates an apparatus 1300 for obtaining an input of a secure multiparty computation protocol according to one embodiment of the present specification. The participants of the secure multiparty computation protocol include a first server which is the server of an object and a third server. The secure multiparty computation protocol bases the calculation on object data of the object, wherein the object data is stored in a second server which is the server of an authorized organization, and the apparatus is implemented in the first server and comprises: a first sending unit 131 configured for sending a data request for the object data to the second server; an obtaining unit 132 configured for obtaining a second ciphertext corresponding to the object data, wherein the second ciphertext is the homomorphically encrypted ciphertext obtained through a public key of the object generated in advance; a receiving unit 133 configured for receiving from the second server the verification data obtained through the method shown in FIG. 2; and a second sending unit 134 configured for sending the second ciphertext and the verification data to the third server.

In one embodiment, in the apparatus for obtaining an input of a secure multiparty computation protocol, the obtaining unit is also configured for receiving from the second server the first ciphertext generated through the method shown in FIG. 2 to be used as the second ciphertext.

In one embodiment, in the apparatus for obtaining an input of a secure multiparty computation protocol, the first server stores the object data, and the obtaining unit is also configured for performing local homomorphic encryption of the object data using the public key and a random number generated locally to obtain the second ciphertext, wherein the data request for the object data contains the random number.

Figure 14:
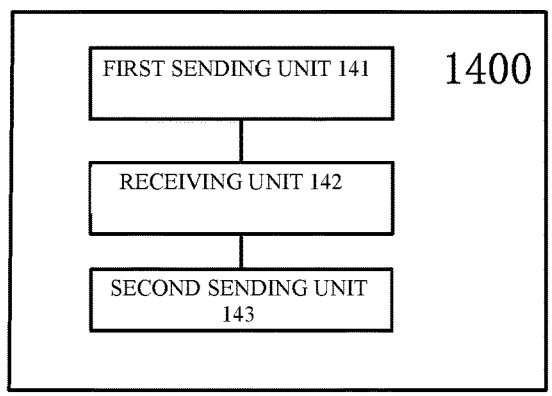
FIG. 14 illustrates an apparatus 1400 for obtaining an input of a secure multiparty computation protocol according to some embodiments of the present specification.

FIG. 14 illustrates an apparatus 1400 for obtaining an input of a secure multiparty computation protocol according to one embodiment of the present specification. The participants of the secure multiparty computation protocol include a first server which is the server of an object and a third server. The secure multiparty computation protocol bases the calculation on object data of the object, wherein the object data is stored in a second server which is the server of an authorized organization, and the apparatus is executed by the first server and comprises: a first sending unit 141 configured for sending a data request for the object data to the second server; a receiving unit 142 configured for receiving from the second server the storage location of the first ciphertext and the authorized organization's digital signature for the first ciphertext in the blockchain ledger; and a second sending unit 143 configured for sending the location in the blockchain ledger to the third server.

Figure 15:
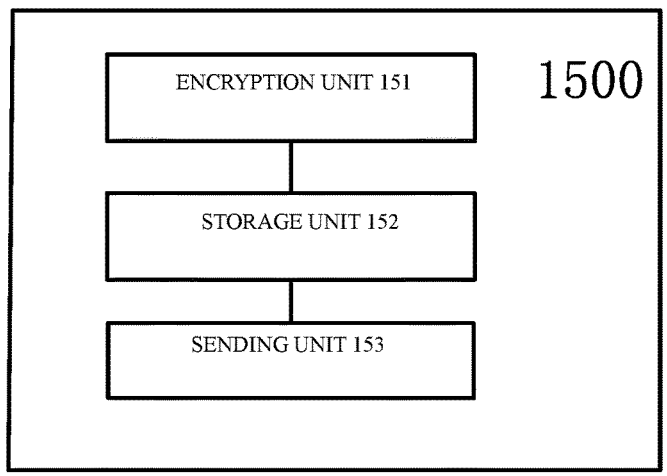
FIG. 15 illustrates an apparatus 1500 for obtaining an input of a secure multiparty computation protocol according to some embodiments of the present specification.

FIG. 15 illustrates an apparatus 1500 for obtaining an input of a secure multiparty computation protocol according to one embodiment of the present specification. The participants of the secure multiparty computation protocol include a first server which is the server of an object and a third server. The secure multiparty computation protocol bases the calculation on object data of the object, wherein the object data is stored in the first server, and the apparatus is executed by the first server and comprises: an encryption unit 151 configured for performing homomorphic encryption of the object data using a public key of the object generated in advance to obtain the ciphertext corresponding to the object data; a storage unit 152 configured for storing the ciphertext in a blockchain to obtain the storage location of the ciphertext in the blockchain ledger; and a sending unit 153 configured for sending the ciphertext and the location in the blockchain ledger to the third server.

Figure 16:
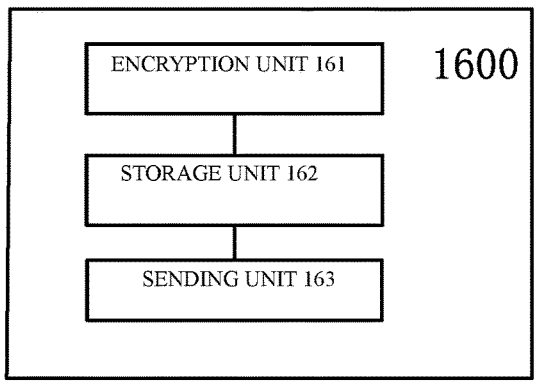
FIG. 16 illustrates an apparatus 1600 for obtaining an input of a secure multiparty computation protocol according to some embodiments of the present specification.

FIG. 16 illustrates an apparatus 1600 for obtaining an input of a secure multiparty computation protocol according to one embodiment of the present specification. The participants of the secure multiparty computation protocol include a first server which is the server of an object and a third server. The secure multiparty computation protocol bases the calculation on object data of the object, wherein the object data is stored in the first server, and the apparatus is implemented in the first server and comprises: an encryption unit 161 configured for performing homomorphic encryption of the object data using a public key of the object generated in advance to obtain the ciphertext corresponding to the object data; a storage unit 162 configured for storing the ciphertext and a digital signature of the object to the ciphertext in a blockchain to obtain the storage locations of the ciphertext and the digital signature in the blockchain ledger, wherein the digital signature is generated by the first server; and a sending unit 163 configured for sending the location in the blockchain ledger to the third server.

Figure 17:
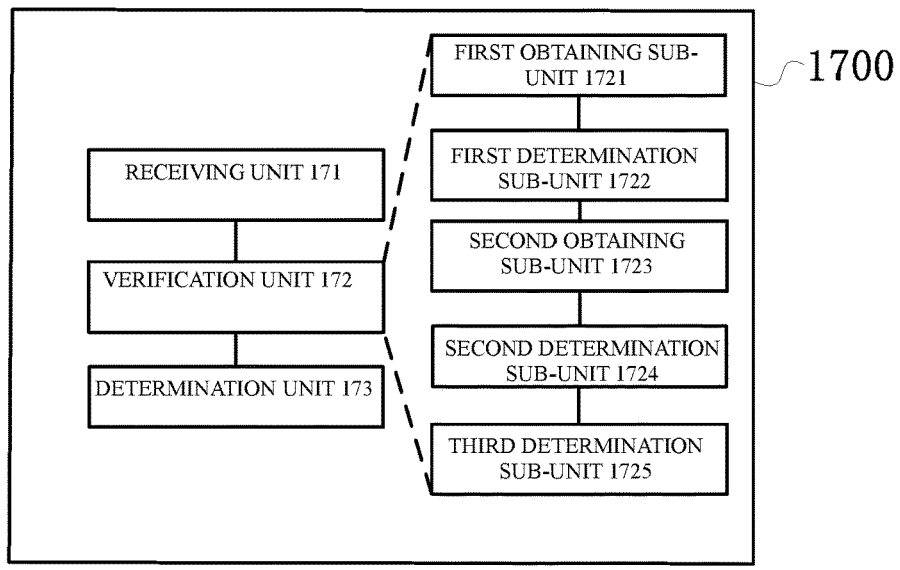
FIG. 17 illustrates an apparatus 1700 for obtaining an input of a secure multiparty computation protocol according to some embodiments of the present specification.

FIG. 17 illustrates an apparatus 1700 for obtaining an input of a secure multiparty computation protocol according to one embodiment of the present specification. The participants of the secure multiparty computation protocol include a first server which is the server of an object and a third server. The secure multiparty computation protocol bases the calculation on object data of the object, wherein the object data is stored in a second server which is the server of an authorized organization, and the apparatus is implemented in the third server and comprises: a receiving unit 171 configured for receiving from the first server the second ciphertext and the verification data obtained through the method shown in FIG. 3; a verification unit 172 configured for verifying the second ciphertext using the verification data to determine whether the second ciphertext corresponds to the object data; and a determination unit 173 configured for determining the second ciphertext as an input to the secure multiparty computation protocol when it is determined that the second ciphertext corresponds to the object data.

In one embodiment, in the apparatus for obtaining an input of a secure multiparty computation protocol, the verification data is the storage location of the first ciphertext and the authorized organization's digital signature for the first ciphertext in the blockchain ledger, wherein the first ciphertext obtained through the method shown in FIG. 2 is stored at the location in the blockchain ledger, wherein the verification unit comprises: a first obtaining sub-unit 1721 configured for obtaining the first ciphertext through the location in the blockchain ledger; and a first determination sub-unit 1722 configured for determining whether the second ciphertext is the same as the first ciphertext.

In one embodiment, in the apparatus for obtaining an input of a secure multiparty computation protocol, the verification data is the storage location of a hash value of the first ciphertext and the authorized organization's digital signature for the hash value of the first ciphertext in the blockchain ledger, wherein the verification unit further comprises: a second obtaining sub-unit 1723 configured for obtaining the hash value of the first ciphertext through the location in the blockchain ledger; and a second determination sub-unit 1724 configured for determining whether the second ciphertext matches the hash value.

In one embodiment, in the apparatus for obtaining an input of a secure multiparty computation protocol, the verification data is the authorized organization's digital signature for the first ciphertext, wherein the verification unit further comprises: a third determination sub-unit 1725 configured for determining whether the second ciphertext matches the digital signature.

Figure 18:
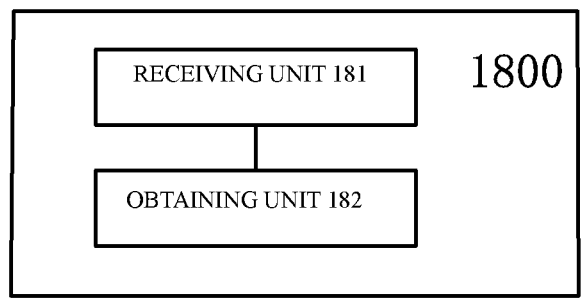
FIG. 18 illustrates an apparatus 1800 for obtaining an input of a secure multiparty computation protocol according to some embodiments of the present specification.

FIG. 18 illustrates an apparatus 1800 for obtaining an input of a secure multiparty computation protocol according to one embodiment of the present specification. The participants of the secure multiparty computation protocol include a first server which is the server of an object and a third server. The secure multiparty computation protocol bases the calculation on object data of the object, wherein the object data is stored in a second server which is the server of an authorized organization, and the apparatus is implemented in the third server and comprises: a receiving unit 181 configured for receiving from the first server the storage location of the first ciphertext and the authorized organization's digital signature for the first ciphertext in the blockchain ledger; and an obtaining unit 182 configured for obtaining the first ciphertext from the location in the blockchain ledger to be used as an input to the secure multiparty computation protocol.

Figure 19:
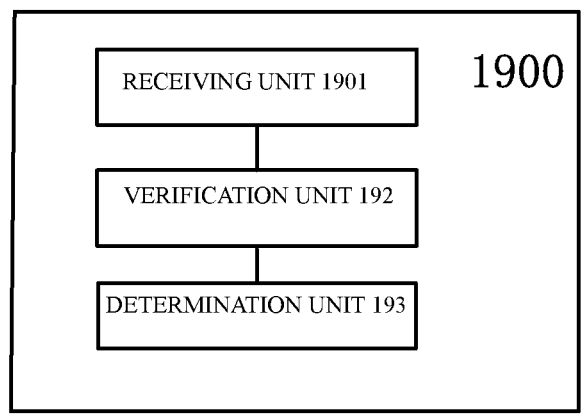
FIG. 19 illustrates an apparatus 1900 for obtaining an input of a secure multiparty computation protocol according to some embodiments of the present specification.

FIG. 19 illustrates an apparatus 1900 for obtaining an input of a secure multiparty computation protocol according to one embodiment of the present specification. The participants of the secure multiparty computation protocol include a first server which is the server of an object and a third server. The secure multiparty computation protocol bases the calculation on object data of the object, wherein the object data is stored in the first server, and the apparatus is implemented in the third server and comprises: a receiving unit 191 configured for receiving from the first server the ciphertext and the location in the blockchain ledger obtained through the method shown in FIG. 5; a verification unit 192 configured for verifying the ciphertext using the location in the blockchain ledger to determine whether the ciphertext corresponds to the object data; and a determination unit 193 configured for determining the ciphertext as an input to the secure multiparty computation protocol when it is determined that the ciphertext corresponds to the object data.

Figure 20:
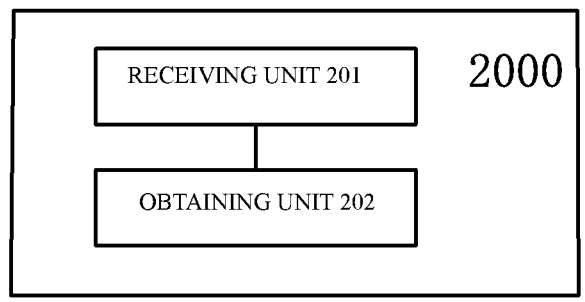
FIG. 20 illustrates an apparatus 2000 for obtaining an input of a secure multiparty computation protocol according to some embodiments of the present specification.

FIG. 20 illustrates an apparatus 2000 for obtaining an input of a secure multiparty computation protocol according to one embodiment of the present specification. The participants of the secure multiparty computation protocol include a first server which is the server of an object and a third server. The secure multiparty computation protocol bases the calculation on object data of the object, wherein the object data is stored in the first server, and the apparatus is implemented in the third server and comprises: a receiving unit 201 configured for receiving from the first server the location in the blockchain ledger obtained through the method shown in FIG. 6; and an obtaining unit 202 configured for obtaining the ciphertext from the location in the blockchain ledger to be used as an input to the secure multiparty computation protocol.

Another aspect of the present specification provides a computer device which comprises a memory and a processor, characterized in that the memory stores executable codes which are executed by the processor to achieve any of the foregoing methods for obtaining an input of a secure multiparty computation protocol.

In some embodiments, various units described herein may refer to corresponding modules. The various modules and units of the apparatus (e.g., apparatus 1200, 1300, 1400, 1500, 1600, 1700, 1800, 1900, 2000) may be implemented as software instructions or a combination of software and hardware. For example, the apparatus for privacy protection (e.g., apparatus 1200, 1300, 1400, 1500, 1600, 1700, 1800, 1900, 2000) may comprise one or more processors (e.g., a CPU) and one or more non-transitory computer-readable storage memories coupled to the one or more processors and configured with instructions executable by the one or more processors to cause one or more components (e.g., the one or more processors) of the apparatus to perform various steps and methods of the modules and units described above (e.g., with reference to the method embodiments). In some embodiments, the apparatus for privacy protection (or referred to as a system for privacy protection, a device for privacy protection) may include a server, a mobile phone, a tablet computer, a PC, a laptop computer, another computing device, or a combination of one or more of these computing devices.

In various embodiments, through endorsing homomorphically encrypted ciphertext and using a secure multiparty computation protocol, the dilemma between data privacy and data credibility is resolved, obviating the use of zero-knowledge proof technology and expensive computation and storage consumption required by the zero-knowledge proof technology. In addition, the present embodiments can solve the problem of data falsification in evaluations involving multiple demonstrators' data.

The embodiments in the application are described in a progressive manner. Reference may be made to each other for the same or similar parts among the embodiments, and in each embodiment, emphasis is focused on the differences from the other embodiments. In particular, for the system embodiments, since they are substantially similar to the method embodiments, the description is relatively simple, and reference may be made to the method embodiments for the description of relevant portions.

Various embodiments of the application are described above. Other embodiments are in the scope of the attached Claims. In some cases, the actions or steps may be executed in a sequence different from that given in the embodiments and can still achieve the expected results. Further, it is not necessary for the process described in the accompanying drawings to require the given specific sequence or a continuous sequence in order to achieve the expected results. In some embodiments, multitasking processing and parallel processing are also acceptable or may be favorable.

Those of ordinary skill in the art should further appreciate that the units and algorithm steps of the various examples described in connection with the embodiments disclosed herein can be implemented with electronic hardware, computer software, or a combination of both. To clearly illustrate the interchangeability of hardware and software, the components and steps of the various examples have been generally described in terms of functions in the description above. These functions are performed with hardware or software, which depends on the specific application and design constraints of the technical solution. Those of ordinary skill in the art may use different methods to implement the described functions for each particular application, but such implementation should not be considered to be beyond the scope of the application.

The steps of the method or algorithm described in connection with the embodiments disclosed herein can be implemented with hardware, software modules executed by a processor, or a combination of both. The software modules may be placed in a random access memory (RAM), a memory, a read only memory (ROM), an electrically programmable ROM, an electrically erasable programmable ROM, a register, a hard disk, a removable disk, CD-ROM, or any other form of storage medium known in the technical field.

The objectives, technical solutions, and beneficial effects of the application are further detailed with the foregoing specific embodiment manners. The foregoing description includes examples of embodiments of the application, and is not intended to limit the scope of the application. Any modifications, equivalent substitutions, improvements, etc. made within the spirit and scope of the application are included within the scope of the application.

The invention claimed is:

1. A method for privacy protection, wherein the method is performed by a second computing device and comprises:
   receiving a data request for object data from a first computing device, wherein the object data is associated with an object and is stored in the second computing device, the second computing device being associated with an authorized organization;
   generating a random number;
   generating a first ciphertext of the object data by performing homomorphic encryption of the object data using a public key of the object and the generated random number;
   generating a hash value of the first ciphertext based on the first ciphertext;
   generating a digital signature of the authorized organization that endorses the hash value;
   storing, at a storage location in a blockchain, the hash value of the first ciphertext, and the authorized organization's digital signature that endorses the hash value;
   obtaining, from the blockchain, verification data for verifying whether a ciphertext to be verified corresponds to the object data, the verification data comprising the storage location in the blockchain;
   sending the generated random number to the first computing device for generating a second cipher text of the object data by performing homomorphic encryption based on the random number and object data stored in the first computing device; and
   sending the verification data to the first computing device for the first computing device to execute a cryptography protocol with a third computing device based on the verification data and the second cipher text of the object data.

2. The method of claim 1, wherein:
sending the verification data to the first computing device comprises sending the verification data and the first ciphertext to the first computing device.

3. The method of claim 1, wherein:
the verification data comprises the authorized organization's digital signature.

4. The method of claim 1, wherein:
sending the verification data to the first computing device for the first computing device to execute a cryptography protocol with a third computing device based on the verification data comprises sending the verification data to the first computing device for the first computing device to execute a secure multiparty computation protocol for the object data with the third computing device based on the verification data.

5. The method of claim 4, wherein:
sending the verification data to the first computing device for the first computing device to execute a secure multiparty computation protocol for the object data with the third computing device based on the verification data comprises:
causing the third computing device to obtain and verify the second ciphertext based on the verification data and to determine the second ciphertext as an input to the secure multiparty computation protocol in response to determining that the first ciphertext corresponds to the object data.

6. A system for privacy protection, wherein the system acts as a second computing device and comprises one or more processors and one or more non-transitory computer-readable memories coupled to the one or more processors and configured with instructions executable by the one or more processors to cause the system to perform operations comprising:
receiving a data request for object data from a first computing device, wherein the object data is associated with an object and is stored in the second computing device, the second computing device being associated with an authorized organization;
generating a random number;
generating a first ciphertext of the object data by performing homomorphic encryption of the object data using a public key of the object and the generated random number;
generating a hash value of the first ciphertext based on the first ciphertext;
generating a digital signature of the authorized organization that endorses the hash value;
storing, at a storage location in a blockchain, the hash value of the first ciphertext, and the authorized organization's digital signature that endorses the hash value;
obtaining, from the blockchain, verification data for verifying whether a ciphertext to be verified corresponds to the object data, the verification data comprising the storage location in the blockchain;
sending the generated random number to the first computing device for generating a second cipher text of the object data by performing homomorphic encryption based on the random number and object data stored in the first computing device; and
sending the verification data to the first computing device for the first computing device to execute a cryptography protocol with a third computing device based on the verification data and the second cipher text of the object data.

7. The system of claim 6, wherein:
sending the verification data to the first computing device comprises sending the verification data and the first ciphertext to the first computing device.

8. A method for privacy protection, wherein the method is performed by a first computing device and comprises:
sending a data request for object data to a second computing device, wherein the object data is associated with an object and is stored in the second computing device, the second computing device being associated with an authorized organization;
in response to sending the data request for object data to the second computing device, receiving verification data from the second computing device and a random number generated by the second computing device, wherein the verification data comprises a storage location in a blockchain of a hash value of a first ciphertext, and a digital signature of the authorized organization that endorses the hash value, the first ciphertext generated by performing homomorphic encryption using a public key of the object and the random number generated by the second computing device to encrypt the object data;
obtaining a second ciphertext corresponding to the object data, wherein the second ciphertext is generated by performing homomorphic encryption using a public key of the object and the random number received from the second computing device to encrypt the object data; and
sending the second ciphertext and the verification data to a third computing device to execute a cryptography protocol with the third computing device based on the verification data.

9. The method of claim 8, wherein:
sending the second ciphertext and the verification data to the third computing device comprises sending the second ciphertext and the storage location to the third computing device.

10. The method of claim 8, wherein:
sending the second ciphertext and the verification data to the third computing device to execute the cryptography protocol with the third computing device based on the verification data comprises sending the second ciphertext and the verification data to the third computing device to execute a secure multiparty computation protocol for the object data with the third computing device based on the verification data.

11. The method of claim 10, wherein:
sending the second ciphertext and the verification data to the third computing device to execute the secure multiparty computation protocol for the object data with the third computing device based on the verification data comprises:
causing the third computing device to obtain and verify the second ciphertext based on the verification data and to determine the second ciphertext as an input to the secure multiparty computation protocol in response to determining that the second ciphertext corresponds to the object data.

* * * * *